(12) United States Patent
Ito et al.

(10) Patent No.: US 9,384,035 B2
(45) Date of Patent: Jul. 5, 2016

(54) VIRTUAL COMPUTER SYSTEM, MANAGEMENT COMPUTER, AND VIRTUAL COMPUTER MANAGEMENT METHOD

(75) Inventors: Atsushi Ito, Tokyo (JP); Satoshi Nakamichi, Yokohama (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 14/408,693

(22) PCT Filed: Aug. 22, 2012

(86) PCT No.: PCT/JP2012/071140
§ 371 (c)(1),
(2), (4) Date: Dec. 17, 2014

(87) PCT Pub. No.: WO2014/030221
PCT Pub. Date: Feb. 27, 2014

(65) Prior Publication Data
US 2015/0193250 A1 Jul. 9, 2015

(51) Int. Cl.
*G06F 3/00* (2006.01)
*G06F 9/44* (2006.01)
*G06F 9/46* (2006.01)
*G06F 13/00* (2006.01)
*G06F 9/455* (2006.01)
*G06F 9/48* (2006.01)

(52) U.S. Cl.
CPC .......... *G06F 9/45558* (2013.01); *G06F 9/4856* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 2010/0017801 A1* | 1/2010 | Kundapur | G06F 9/45558 718/1 |
| 2010/0031258 A1 | 2/2010 | Takano et al. | |
| 2011/0161491 A1* | 6/2011 | Sekiguchi | G06F 9/5077 709/224 |
| 2012/0131576 A1 | 5/2012 | Hatta et al. | |

(Continued)

FOREIGN PATENT DOCUMENTS

| | | |
|---|---|---|
| JP | 2001-216182 A | 8/2001 |
| JP | 2009-146161 A1 | 7/2009 |
| JP | 2010-033404 A | 2/2010 |

(Continued)

OTHER PUBLICATIONS

PCT International Search Report and Written Opinion on application PCT/JP2012/071140 mailed Oct. 2, 2012; 2 pages.

(Continued)

*Primary Examiner* — Craig Dorais
(74) *Attorney, Agent, or Firm* — Foley & Lardner LLP

(57) ABSTRACT

A virtual computer system includes: a plurality of computers on which at least one virtual computer operates on a hypervisor; and a management computer that manages the plurality of computers, wherein the management computer includes: an input unit that accepts an operation input of an operator; a screen generation unit that acquires, in a state where a first virtual computer operates on a first computer, progress information concerning a live migration in which the first virtual computer is transferred from the first computer to a second computer, the progress information being acquired from the first computer, that generates statistical information concerning the live migration on the basis of the acquired progress information, and that generates a statistics screen containing the statistical information; and an output unit that displays the statistics screen.

13 Claims, 23 Drawing Sheets

(56) References Cited

U.S. PATENT DOCUMENTS

2013/0152083 A1 6/2013 Miki et al.
2013/0326177 A1 12/2013 Oiwa

FOREIGN PATENT DOCUMENTS

| JP | 2011-138184 A | 7/2011 |
| JP | 2011-232916 A | 11/2011 |
| JP | 2012-108816 A | 6/2012 |
| WO | WO 2014/087544 A1 | 12/2014 |

OTHER PUBLICATIONS

PCT International Search Report on application PCT/JP2012/071140 mailed Oct. 2, 2012; 3 pages.
Japanese Patent Office action on application 2014-531418 dated Nov. 17, 2015; 5 pages.
Japan Patent Office Notification of Reasons for Refusal on application 2014-531418 dated Feb. 23, 2016; 2 pages.

* cited by examiner

Fig. 2

| Virtual memory page start address | Physical memory page start address | Page size | Rewrite flag | Transfer flag |
|---|---|---|---|---|
| ADDR_L0 | ADDR_P0 | MP0 | 1 | 0 |
| ADDR_L1 | ADDR_P1 | MP1 | 0 | 1 |
| ADDR_L2 | ADDR_P2 | MP2 | 0 | 1 |
| .... | .... | .... | .... | .... |

Memory management information

Fig. 3

| | Status management information | | | 101 |
|---|---|---|---|---|
| 111 | 112 | 113 | | |
| Item name | Value | Set flag | | |
| Current time point | T0 | 0 | | 115a |
| Migration situation | STATE0 | 0 | | 115b |
| Command in execution | PROCESS0 | 0 | | 115c |
| Transferred data amount | DT0 | 0 | | 115d |
| Dirty page amount | MD0 | 0 | | 115e |
| Determination threshold | TH0 | 1 | | 115f |
| Upper limit value of transfer band | RATE0 | 1 | | 115g |
| Upper limit value of virtual CPU allocation resource | CPU_T0 | 1 | | 115h |
| Upper limit value of DMA interrupt | DMA_DLY0 | 1 | | 115i |
| Timeout time | TIMEOUT0 | 1 | | 115j |
| .... | .... | .... | | |

Fig. 9

Statistical information — 103

| Time point ⌐131 | Transfer rate ⌐132 | Average transfer rate ⌐133 | Dirty page amount ⌐134 | Increase/decrease of dirty page amount ⌐135 | Total transferred amount ⌐136 | Determination threshold ⌐137 |
|---|---|---|---|---|---|---|
| T0 | DR0 | ADR0 | MD0 | dMD0 | DT0 | TH |
| T1 | DR1 | ADR1 | MD1 | dMD1 | DT1 | TH |
| T2 | DR2 | ADR2 | MD2 | dMD2 | DT2 | TH |
| ... | ... | ... | ... | ... | ... | ... |

| 1 | 0 | 0 | 1 | 0 | 0 | 1 | 1 | 0 | 0 | 0 | 1 |
|---|---|---|---|---|---|---|---|---|---|---|---|
| 0 | 0 | 0 | 0 | 1 | 0 | 1 | 1 | 0 | 1 | 0 | 1 |

(B)

VIRTUAL COMPUTER SYSTEM, MANAGEMENT COMPUTER, AND VIRTUAL COMPUTER MANAGEMENT METHOD

TECHNICAL FIELD

The present invention relates to management of a virtual computer system.

BACKGROUND ART

In a virtual computer system, one or more virtual computers (hereinafter referred to as a "virtual computer") can be constructed on one physical computer (hereinafter referred to as a "physical computer"). The virtual computer systems is capable of independently operating an OS (Operating System) on each of virtual computers (sometimes referred to as an LPAR (Logical Partition)). Thus, a plurality of OSs may be operated on one physical computer.

A live migration technology is known in which data constituting a virtual computer on a certain physical computer is made to migrate to a virtual computer on another physical computer in a state where the virtual computer is in operation in a virtual computer system (PLTs 1 and 2).

CITATION LIST

Patent Literature

[PLT 1] Japanese Patent Application Publication No. 2010 0331032010-033404.
[PLT 2] Japanese Patent Application Publication No. 2012-108816

SUMMARY OF INVENTION

Technical Problem

A live migration is executed in a state where an OS and such on an LPAR are in operation. Therefore, while data retained by a memory is being transferred from a migration source computer to a migration destination computer, pages may be updated in a memory having a plurality of pages (storage areas) (for instance, data in a page may be updated, or data to be transferred may be newly written in a page). In this case, data of an updated page is transferred to the migration destination computer.

In a migration, it is necessary to transfer all information such as a configuration and a status of a migration source computer from a hardware configuration to data on a memory to a migration destination computer. A "live" migration is a migration in a state where a computer is in operation. Therefore, data on a memory updated during a migration is also required to be transferred to the migration destination computer.

Users must operate a virtual computer system without a problem even when a live migration is executed. Therefore, administrators (users) of virtual computer systems have a need to be able to manage and control more in detail a status concerning a live migration. For instance, when supposedly an OS and such on a LPAR frequently access a memory, since transfers of memory pages updated by accesses thereof occur many times, the live migration may possibly be not completed indefinitely. Accordingly, users have a need to grasp in advance whether or not a live migration process is normally completed in order to properly operate a virtual computer system.

An objective of the present invention is to enable a user to grasp a status of a live migration process of a virtual computer system and properly manage and control a target of the migration.

Solution to Problem

A virtual computer system according to an embodiment of the present invention includes: a plurality of computers on which at least one virtual computer operates on a hypervisor; and a management computer that manages the plurality of computers, wherein the management computer includes: an input unit that accepts an operation input of an operator; a screen generation unit that acquires, in a state where a first virtual computer operates on a first computer, progress information concerning a live migration in which the first virtual computer is transferred from the first computer to a second computer, the progress information being acquired from the first computer, that generates statistical information concerning the live migration on the basis of the acquired progress information, and that generates a statistics screen containing the statistical information; and an output unit that displays the statistics screen.

A process that the output unit "displays" may be to display the statistics screen on a display apparatus included in the management computer, or may be to transmit statistics screen information to a remote computer, coupled to the management computer, having a display apparatus. In the latter case, the remote computer displays the statistics screen on the display apparatus included in the remote computer on the basis of the information that the remote computer receives from the management computer.

Advantageous Effects of Invention

According to the present invention, users may grasp a status of a live migration process on a virtual computer system and properly manage and control a migration target.

BRIEF DESCRIPTION OF DRAWINGS

FIG. 2 is a view illustrating an example of memory management information included in a hypervisor.
FIG. 3 is a view illustrating an example of status management information included in a hypervisor.
FIG. 9 is a view illustrating an example of migration statistical information displayed on the statistics screen.
FIG. 13 is a view illustrating an example of generation and display of a memory map corresponding to a first display.

DESCRIPTION OF EMBODIMENTS

Hereinafter, one embodiment of a virtual computer system that graphically presents various information during a live migration to a user is described.

Figure 1:
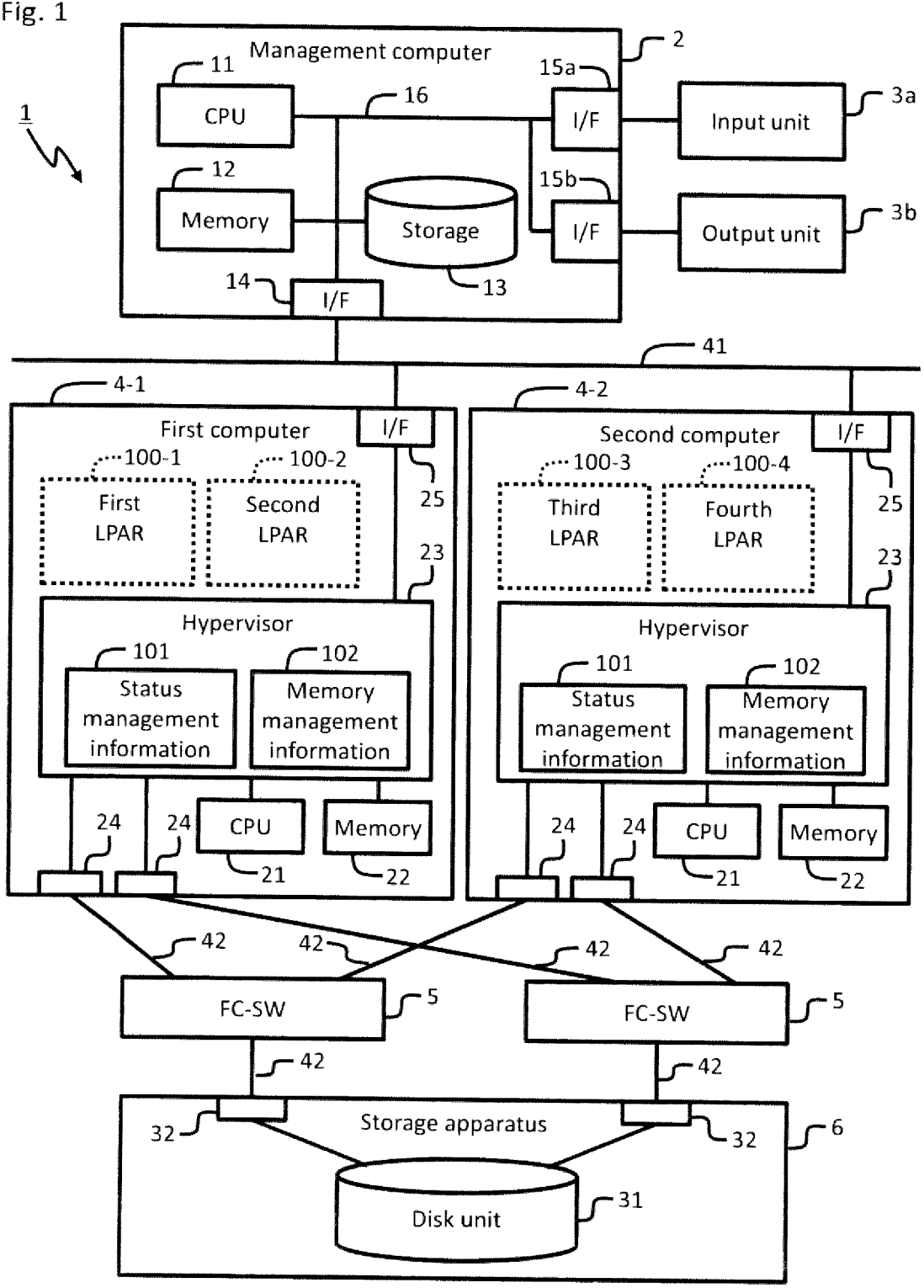
FIG. 1 is a view illustrating an entire configuration of a computer system.

FIG. 1 is a view illustrating an entire configuration of a virtual computer system. A virtual computer system 1 includes, for instance, a first computer 4-1 and a second computer 4-2, a management computer 2, and a storage apparatus 6. Hereinafter, the first computer 4-1 and a second computer 4-2 may be referred to as a computer 4 without distinguishing them.

The management computer 2, the first computer 4-1, and the second computer 4-2 are coupled through a communication network 41. An input unit 3a is coupled to the management computer 2 through an input IF 15a. An output unit 3b is coupled to the management computer 2 through an output IF 15b.

The first computer 4-1 and the second computer 4-2 are coupled to the storage apparatus 6 with an FC cable 42 through an FC-SW (Fiber Channel-Switch) 5. Another type of switch may be adopted in place of the FC-SW5, and another type of cable may be adopted in place of the FC cable 42.

The output unit 3b outputs output information generated by the management computer 2. The output unit 3b, for instance, displays screen information. The input unit 3a communicates an input indication to the management computer 2 after accepting the input indication from a user. The output unit 3b is, for instance, a liquid crystal display that outputs with a screen, a speaker that outputs with a voice, and such. The input unit 3a is, for instance, a key board, a mouse, a microphone, and such. Furthermore, a touch panel display and such that serve as both input unit 3a and output unit 3b may be acceptable.

The storage apparatus 6 stores data concerning the computer 4. The storage apparatus 6 includes a disk unit 31 and an FC-HBA (Fiber Channel-Host Bus Adapter) 32. Another type of HBA may be adopted in place of the FC-HBA 32.

The FC cable 42 is coupled to the FC-HBA 32. The storage apparatus 6 writes write data transmitted from the computer 4 to the disk unit 31. The storage apparatus 6 reads read data requested by the computer 4 from the disk unit 31 and returns the data to the computer 4. The disk unit 31 is, for instance, constituted of an HDD (Hard Disk Drive), a flash memory, and such.

The computer 4 executes various calculation processes. The computer 4 includes, for instance, a CPU (Central Processing Unit) 21, a memory 22, a hypervisor 23, a communication IF 25, and an FC-HBA 24. These elements 21 to 25 are coupled through a bus (not shown in a figure) capable of bidirectionally transmitting data.

The CPU 21 executes a computer program expanded in the memory 22. A plurality of CPUs 21 may be included.

The hypervisor 23 materializes a virtualization function. Generally, the computer 4 may execute only one OS on one chip set that is constituted of the CPU 21, the memory 22, and such. However, by being coupled through the hypervisor 23, the computer 4 may simultaneously execute a plurality of OSs on one chip set constituted of the CPU 21, the memory 22, and such. For instance, a first LPAR 100-1 and a second LPAR 100-2 may be constructed on the hypervisor 23 as virtual computers, and a different OS may be simultaneously executed at each of the first LPAR 100-1 and the second LPAR 100-2.

The hypervisor 23 manages distribution (allotment) of resources of the CPU 21, the memory 22, and such for each LPAR (or, OS). In other words, the hypervisor 23 properly distributes the physical resources of the CPU 21 and the memory 22 for a plurality of OSs being simultaneously executed according to a situation on a moment-to-moment basis. From each OS, a virtual CPU and memory resources distributed from the hypervisor 23 are recognized as an actual CPU and a memory. These virtual CPU and a memory may be called a virtual CPU and a virtual memory.

The hypervisor 23 manages a relation between each OS and a predetermined storage area of the storage apparatus 6. The hypervisor 23, when receiving an indication of writing/reading to/from the storage apparatus 6 from a certain OS, transmits the indication to FC-HBA 24 storage apparatus 6 through the FC-HBA 24. The hypervisor 23, when receiving a response to the writing/reading to/from a certain OS from the storage apparatus 6 through the FC-HBA 24, communicates the received response to a proper OS. A reason why two FC-HBAs 24 are provided is to properly materialize a live migration and heighten redundancy.

The hypervisor 23 is, for instance, executed as a firmware of a chip set. In other words, the hypervisor 23 may directly control and manage resources such as the physical CPU 21 and the memory 22. The hypervisor 23 may be materialized as a thing like a physical chip set (for instance, may have a physical storage resource that stores the hypervisor 23 as a computer program and a physical CPU that executes the hypervisor 23 and by executing the hypervisor 23 with the physical CPU, may be a circuit that functions as a hypervisor) and may be materialized as a computer program that is executed on a physical CPU.

The hypervisor 23 retains memory management information 102 that manages correspondence between each LPAR 100 and the memory 22 and status management information 101 that manages information concerning setting and status of each LPAR 100 and the CPU 21. Next, a description will be made concerning the management information 101 and 102.

FIG. 2 is a view illustrating an example of memory management information 102 included in the hypervisor 23. The memory management information 102 manages correspondence between a page address of a virtual memory provided to an OS that is executed on the hypervisor 23 and a page address of the physical memory 22. In other words, the hypervisor 23 manages the memory management information 102 for each LPAR 100.

The memory management information 102 includes as data items a virtual memory page start address 121, a physical memory page start address 122, a page size 123, a rewrite flag 124, and a transfer flag 125.

A page means a unit of an area formed by dividing the memory into a plurality of pieces. To perform a live migration, a function of monitoring writing by an OS on a page-by-page basis as a hardware assistance is important.

"A memory page" is a management unit of a memory that is handled in a memory management method generally called a paging system. In other words, a memory area is handled not in one bit unit but in a page unit of a predetermined size (generally, 4 Kbyte or 2 MByte). For instance, when even one bit of data contained in one page is updated, it is treated as an entire one page is updated (rewritten).

The virtual memory page start address 121 represents a start address of a virtual memory page recognized by a certain OS.

The physical memory page start address 122 represents a start address of a physical memory page corresponding to the virtual memory page start address 121.

The page size 123 represents a size of a memory page that is started from the virtual memory page start address 121 or the physical memory page start address.

The rewrite flag 124 is a flag that indicates whether or not rewrite occurs in a memory page. In other words, the rewrite flag 124 is a flag for managing a memory page as a dirty page that is rewritten when a write request to the memory occurs during memory transfer of a live migration. In other words, the rewrite flag 124 is used for determining whether or not the corresponding memory page is a dirty page. When the rewrite flag 124 is "1", that means a rewrite occurs, and when the rewrite flag 124 is "0", that means a rewrite does not occur. A detail of a timing when the rewrite flag 124 is updated is described later. To manage the rewrite flag 124, it is necessary to always monitor accesses to the memory. Consequently, performance of reading/writing of the memory may possibly degrade compared to a case where no monitoring is performed. Therefore, during a normal operation (other than during execution of a live migration), an operation in which the rewrite flag 124 is not managed is preferred.

Next, a further explanation concerning a dirty page is made. A dirty page means a page that is rewritten by a certain writing and such while data is transferred to the second computer 4-2 of a migration destination, among a plurality of pages contained in the memory of the first computer 4-1 of a migration source, in a live migration process in which the memory of the first computer 4-1 is transferred to the memory of the second computer 4-2 of the migration destination, in a state where an OS of an LPAR of the first computer 4-1 of the migration source is in operation.

For instance, a virtual memory used by the LPAR of the migration source of the live migration is assumed to include page addresses from 1 to 100. The page addresses are page addresses of a virtual memory recognized by the OS on the LPAR, and may be different from page addresses of the physical memory. A correspondence between page addresses of the virtual memory and the physical memory is managed by the memory management information 102.

When the live migration starts, the hypervisor 23 transfers memory data from page address 1 one page by one page in order from the migration source computer to the migration destination computer. When Nth (N is a positive integer) page is already rewritten, transfer of the page is skipped.

When processing up to an address 100 is completed in the above-described procedure, the hypervisor 23 checks a status of the entire memory (page addresses 1 to 100). In the memory, there exist a) pages whose transfers are skipped because the pages are already rewritten, and b) pages that are rewritten after transfers. In either case of a) or b) described above, the rewrite flags 124 are made to be "1". The hypervisor 23 regards those pages whose rewrite flags 124 are made to be "1" as dirty pages.

When the dirty page amount is equal to or less than a predetermined threshold, the hypervisor 23 temporarily stops the migration source computer and moves to a final process of the live migration that transfers all remained statuses and data of that time point together. When the dirty page amount is larger than the predetermined threshold, the hypervisor 23 performs a process of transferring the dirty pages. After that, rewriting of a memory by a computer in operation and data transfers of the dirty pages by the hypervisor 23 are repeated until the dirty page amount becomes equal to or less than the predetermined threshold.

A transfer flag 125 is a flag that indicates whether a data transfer (a migration) of a memory page is allowed. When the transfer flag is "1", that means a permission for a transfer. When the transfer flag is "0", that means a forbiddance for a transfer.

For instance, when data is being written on a certain page, the transfer flag 125 corresponding to the page is set to be "0". Thereby, it is possible to protect data of the page from being transferred while writing is being performed. Specifically, when a write for changing memory contents and a read for transferring the memory contents are competing, unfinished data is made not to be transferred. As a result, system reliability may be enhanced.

A first record 127 of the memory management information 102 illustrated in FIG. 2 indicates that a start address "ADDR_L0 (a predetermined page address number)" in a virtual memory page corresponds to a start address "ADDR_P0 (a predetermined page address number)" in a physical memory page, indicates that a size of the memory page is "MP0 (a predetermined byte size)", and also indicates that a rewrite occurs in the memory page (a rewrite flag 124 is "1"), and data of the memory page is forbidden to be transferred (a transfer flag 125 is "0").

FIG. 3 is a view illustrating an example of the status management information 101 included in the hypervisor 23. The status management information 101 manages an execution situation and setting information concerning the live migration process of the LPAR 100. In other words, the hypervisor 23 has the status management information 101 for each LPAR 100. The status management information 101 has information (hereinafter referred to as "status information") that is changeable according to an execution status of an OS and such on the LPAR 100 and information (hereinafter referred to as "setting information") that is changeable according to a setting by a user.

The status management information 101 has as data items an item name 111, a value 112, and a set flag 113. When the set flag 113 is "1", a user is allowed to set the value 112. When the set flag 112 is "0", a user is not allowed to set the value 112.

The status management information 101 has as item names 111 associated with a live migration process, for instance, a current time point 115a, a migration situation 115b, a command in execution 115c, a transferred data amount 115d, a dirty page amount 115e, a determination threshold 115f, an upper limit value 115g of a transfer band, an upper limit value 115h of a virtual CPU allocation resource, an upper limit value 115i of a DMA interruption, and a timeout time 115j.

The current time point 115a is status information representing the current time point. The migration situation 115b is status information representing the current situation. The migration situation 115b has, for instance, information such as unexecuted/in execution/in a final process. The command in execution 115c is status information representing a command currently in execution in the live migration process. The transferred data amount 115d is status information representing a total amount of data whose transfer is completed in the live migration process. The dirty page amount 115e is an amount of dirty pages (the number of dirty pages in the present embodiment) currently remaining in the live migration process.

The determination threshold 115f is a set value for determining a start of a final process of the live migration. A final process of the live migration means a process of transferring remaining data that may not be transferred while an OS and such are executed on the LPAR of the migration source to the LPAR of the migration destination by temporarily stopping the virtual CPU of the LPAR. In other words, the final process of the live migration collectively transfers dirty pages remaining till the end by temporarily stopping the virtual CPU of the LPAR. Here, time in which the virtual CPU may be stopped without influencing execution of the OS and such on the LPAR is limited. Therefore, the final process of the live migration is required to be started after a dirty page amount becomes sufficiently small. The determination threshold is used for determining whether or not the dirty page amount is sufficiently small to be able to start the final process of the live migration.

The upper limit value 115g of the transfer band is a set value representing an upper limit of a communication band usable for data transfer of the live migration process.

The upper limit value 115h of the virtual CPU allocation resource is a set value representing an upper limit of a resource (available time of a physical CPU) allocated to the virtual CPU used by the LPAR of the migration source in the live migration in execution. In other words, the upper limit value 115h of the virtual CPU allocation resource means a value for temporarily lowering and slowing down process performance of the OS or the LPAR aiming at suppressing an increase of the dirty pages during the live migration when completing the live migration in predetermined time is desired, for instance.

The upper limit value 115i of the DMA interruption is a set value representing an upper limit of interruption delay time from a DMA during the live migration process. The timeout time 115j is a set value representing time to a timeout of the live migration process. The live migration process is forcibly stopped when it is not completed by the timeout time. Next, a description is returned to FIG. 1.

The management computer 2 manages a plurality of computers 4. The management computer 2 includes, for instance, a CPU 11, a memory 12, a storage 13, a communication IF 14, an input IF 15a, and an output IF 15b, wherein each of the elements 11 to 15 are bidirectionally coupled to one another through a bus 16 capable of transmitting data.

The CPU 11 executes a computer program expanded to the memory 12, and materializes various functions that the management computer 2 described later has.

The storage 13 retains a computer program, data, and such. The computer program and the data are expanded to the memory 12 as needed and executed on the CPU 11.

The communication IF 14 is coupled to a communication network 41. The CPU 11 is capable of transmitting/receiving data with each of the computers 4 through the communication IF 14.

The input IF 15a is coupled to the input unit 3a. The output IF 15b is coupled to the output unit 3b. The CPU 11 outputs a signal for a screen display to the output unit 3b through the output IF 15b, and receives a signal concerning a user operation from the input unit 3a through the input IF 15a.

Figure 4:
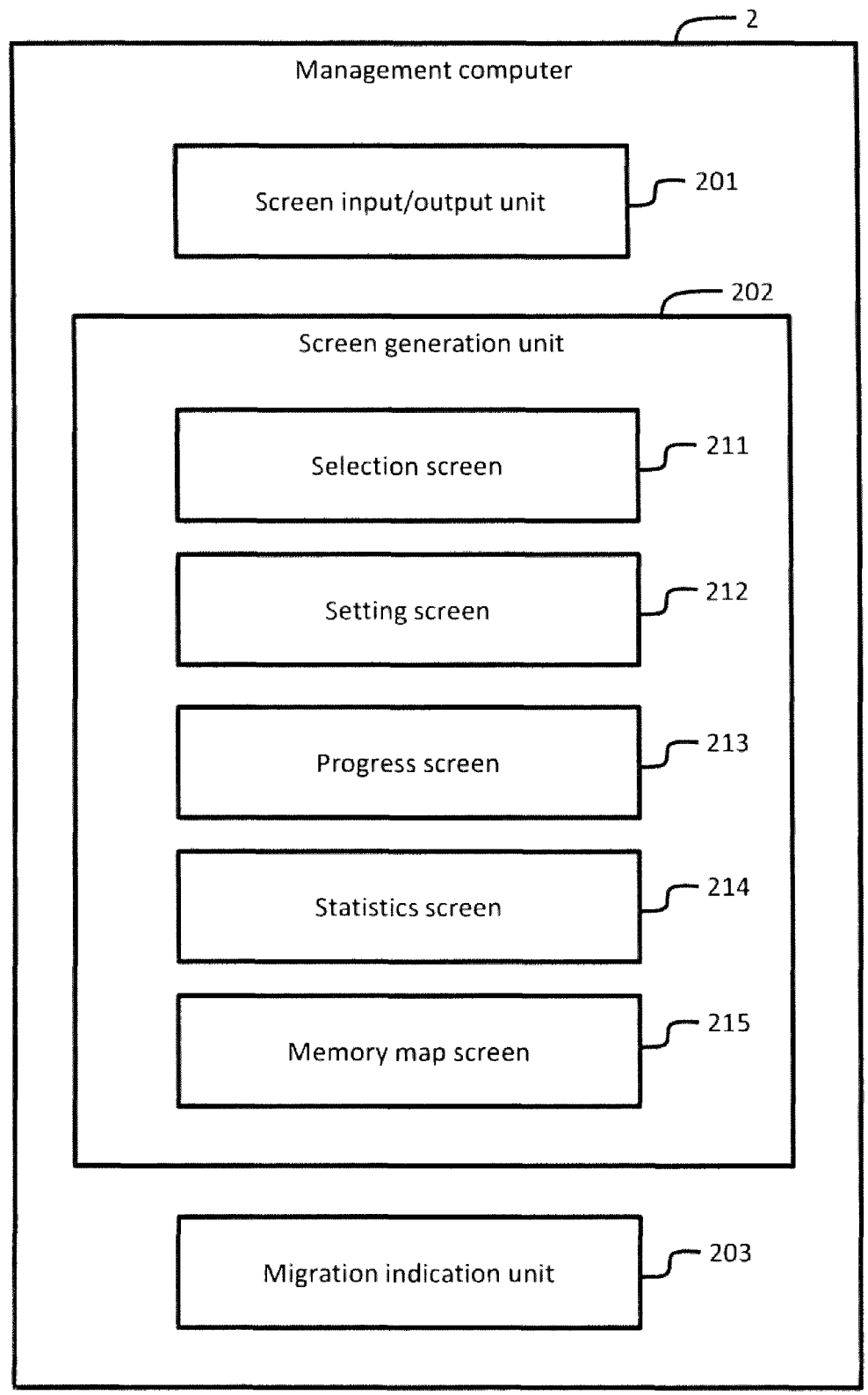
FIG. 4 is a view illustrating a function configuration included in a management computer.

FIG. 4 is a view illustrating a function configuration included in the management computer 2. The management computer 2, for instance, generates a GUI (Graphical User Interface) that enables a user to easily manage the plurality of computers 4. The management computer 2 receives an indication from a user through the GUI, and transmits a command for materializing the indication to each of the computers 4.

The management computer 2 includes a screen input/output unit 201 and a screen generation unit 202. The screen input/output unit 201 outputs various screens (GUI) generated by the screen generation unit 202 described later at the output unit (display unit) 3b and display. The screen input/output unit 201 lets a user to select an instruction group displayed as GUI buttons and such at the output unit 3b from the input unit 3a with a user operation, and communicates the selection result to the screen generation unit 202 and/or a migration indication unit 203 as a user indication. The migration indication unit 203 transmits a command concerning the live migration process to each of the computers 4, and receives a response concerning the live migration process from each of the computers 4, on the basis of the indication communicated from the screen input/output unit 201.

The above described functions 201, 202, and 203 are materialized, for instance, by corresponding computer programs being executed on the CPU 11. All or part of the above described functions 201, 202, and 203 may be materialized by dedicated hardware such as an ASIC (Application Specific Integrated Circuit).

The screen generation unit 202 generates various screens concerning the live migration process. The screen generation unit 202, for instance, generates a selection screen 211, a setting screen 212, a progress screen 213, a statistics screen 214, a memory map screen 215, and such. Next, each of the screens is described in detail.

Figure 5:
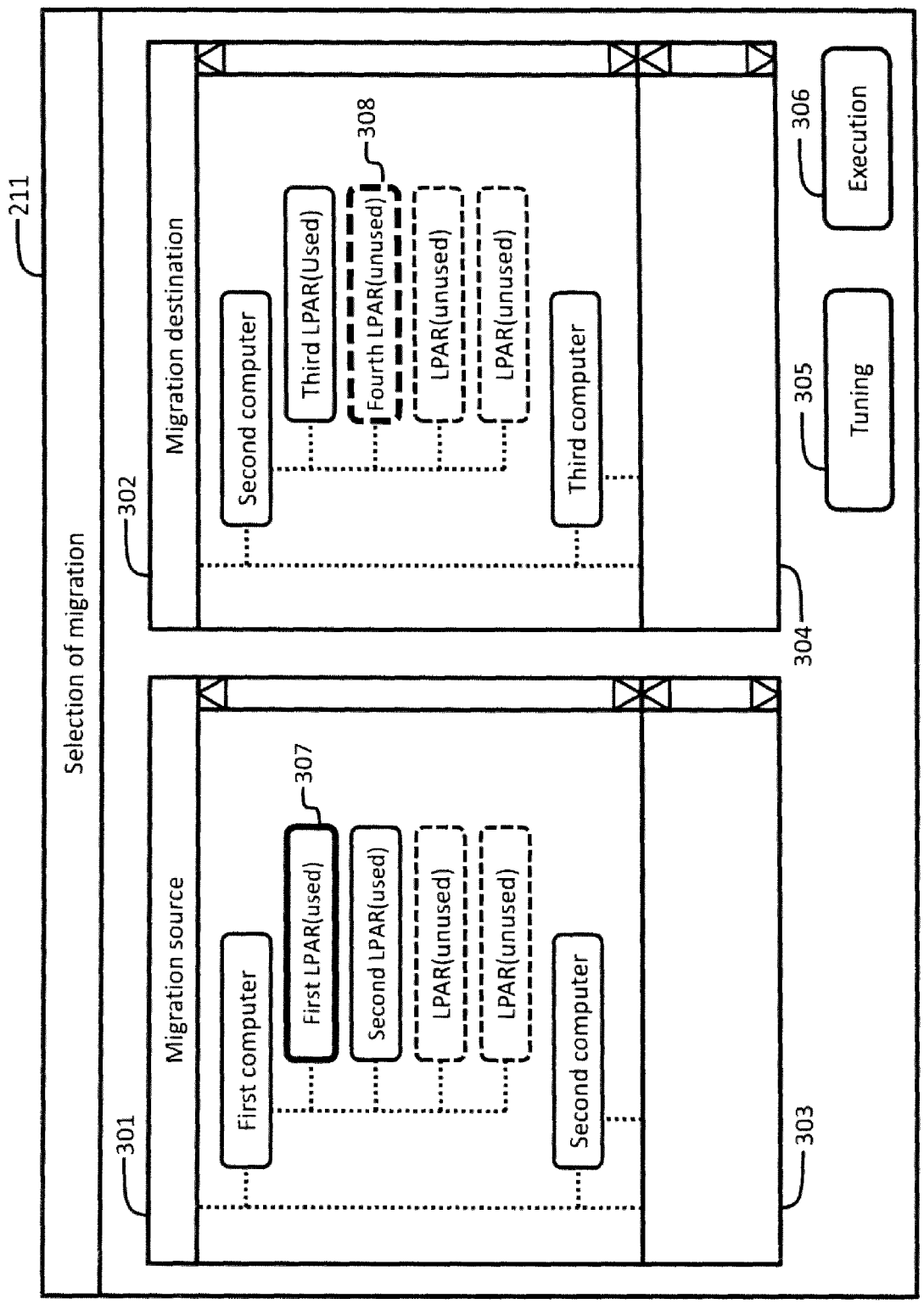
FIG. 5 is a view illustrating an example of a selection screen of a live migration.

FIG. 5 is a view illustrating an example of the selection screen of the live migration. A user selects the LPAR 100, which is a target of the live migration process, at the selection screen 211.

The selection screen 211 includes: a selection area 301 of the migration source; an LPAR information display area 303 of the migration source; a selection area 302 of the migration destination; and an LPAR information display area 304 of the migration destination. The selection screen 211 includes: a tuning button 305; and an execution button 306.

When a user selects a first LPAR 307 of the migration source from the selection area 301 of the migration source, LPAR information of the selected first LPAR 307 is displayed in the LPAR information display area 303 of the migration source. In the LPAR information display area 303, for instance, a chassis ID of the first LPAR 307, HVM ID, an LPAR number, an LPAR name, and such are displayed.

When a user selects a fourth LPAR 308 of a migration destination from the selection area 302 of the migration destination, LPAR information of the selected fourth LPAR 308 is displayed in the LPAR information display area 304 of the migration destination. A user selects unused LPAR as the migration destination.

When a user selects the execution button 306, a live migration process is started and the process transits to the progress screen 213 described later.

When a user selects the tuning button 305 before selecting the execution button 306, the process transits to the setting screen 212. Next, the setting screen 212 is described.

Figure 6:
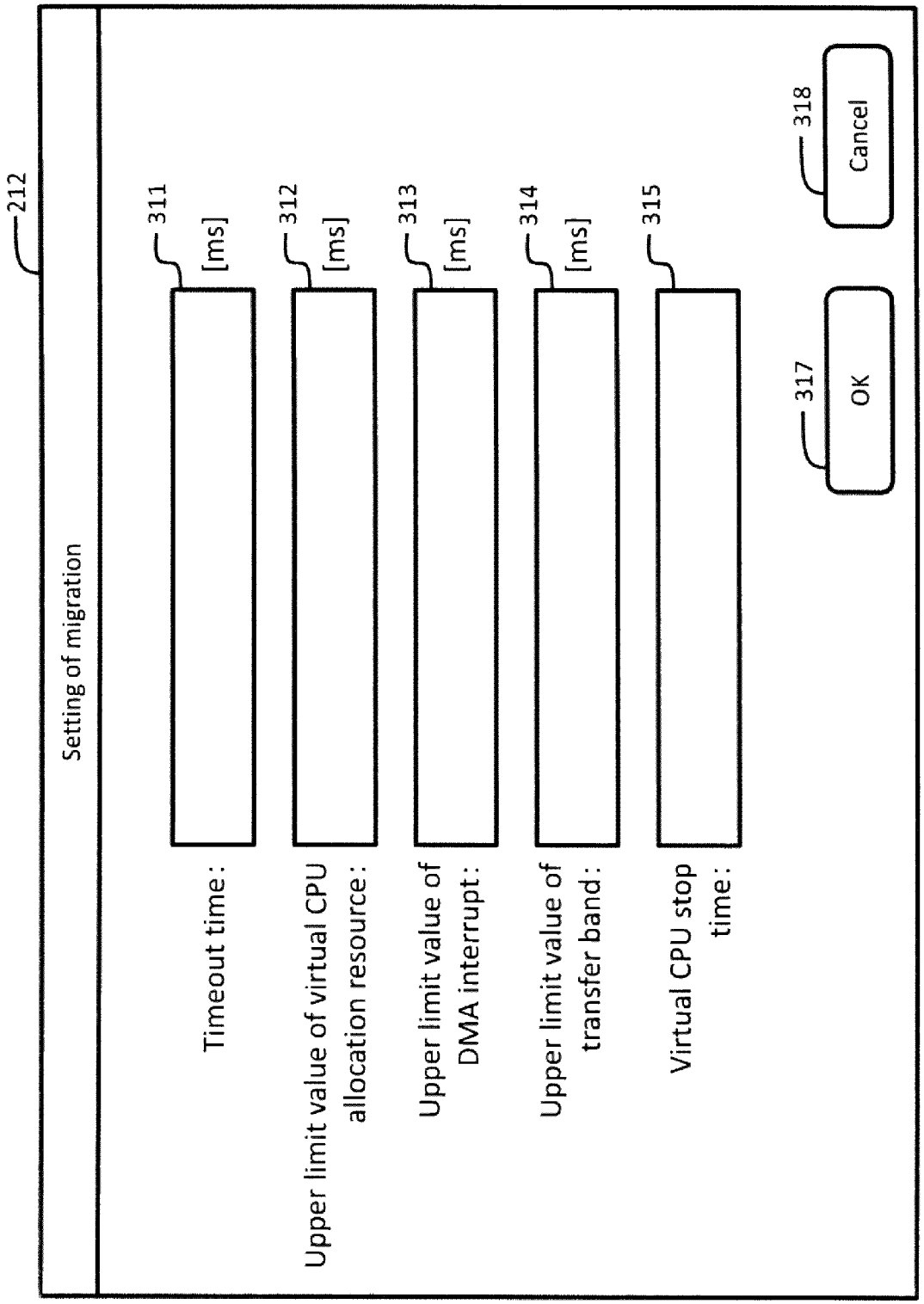
FIG. 6 is a view illustrating an example of a setting screen of the live migration.

FIG. 6 is a view illustrating an example of the setting screen 212 of the live migration process. At the setting screen 212, a user may set a set value concerning the live migration process.

The setting screen 212 includes: a timeout time set area 311; an upper limit value set area 312 of a virtual CPU allocation resource; an upper limit value set area 313 of a DMA interrupt; an upper limit value set area 314 of a transfer band; and a virtual CPU stop time set area 315. The setting screen 212 includes an OK button 317 and a cancellation button 318.

A maximum value of time to timeout of the live migration process may be input to the timeout time set area 311. A value input to the set area 311 is set to the timeout time of the status management information 101.

An upper limit value (maximum value) of a resource (for instance, time to which a physical CPU is allocated) that is allocated to a virtual CPU in which the LPAR of the migration source while the live migration is executed may be input to the upper limit value set area 312 of a virtual CPU allocation resource. A value input to the set area 312 is set to the upper limit value 115h of the virtual CPU allocation resource of the status management information 101. In this manner, while the live migration is executed, by daring to provide a resource to be allocated to a virtual CPU with an upper limit to lower virtual CPU performance, performance of the LPAR of the migration source is lowered and thus an increase of a dirty page amount may be suppressed.

To the upper limit value set area 313 of a DMA interrupt, an upper limit value of interruption delay time from the DMA during the live migration process may be input. A value input to the set area 313 is set to the upper limit value 115i of the DMA interrupt of the status management information 101.

To the upper limit value set area 312 of the transfer band, an upper limit value of a communication band used for data transfer of the live migration process may be input. A value input to the set area 314 is set to the upper limit value 115g of the transfer band of the status management information 101.

To the virtual CPU stop time set area 315, time for which the virtual CPU may be stopped may be input. A value input to the set area 315 is used for determining a start of the final process of the live migration. In other words, the value input to the set area 315 is converted to a determination threshold from a product with the upper limit value of the transfer band and is set to a determination threshold of the status management information 101.

When the OK button 317 is selected, a value input to each of the set areas 311 to 315 is set to the status management information 101. When the OK button 317 is selected while the live migration process is executed, the value input to each of the set areas 311 to 315 is reflected in the live migration process that is executed.

When the cancellation button 318 is selected, a value input to each of the set areas 311 to 315 is discarded and a transition is made to a previous screen.

Figure 7:
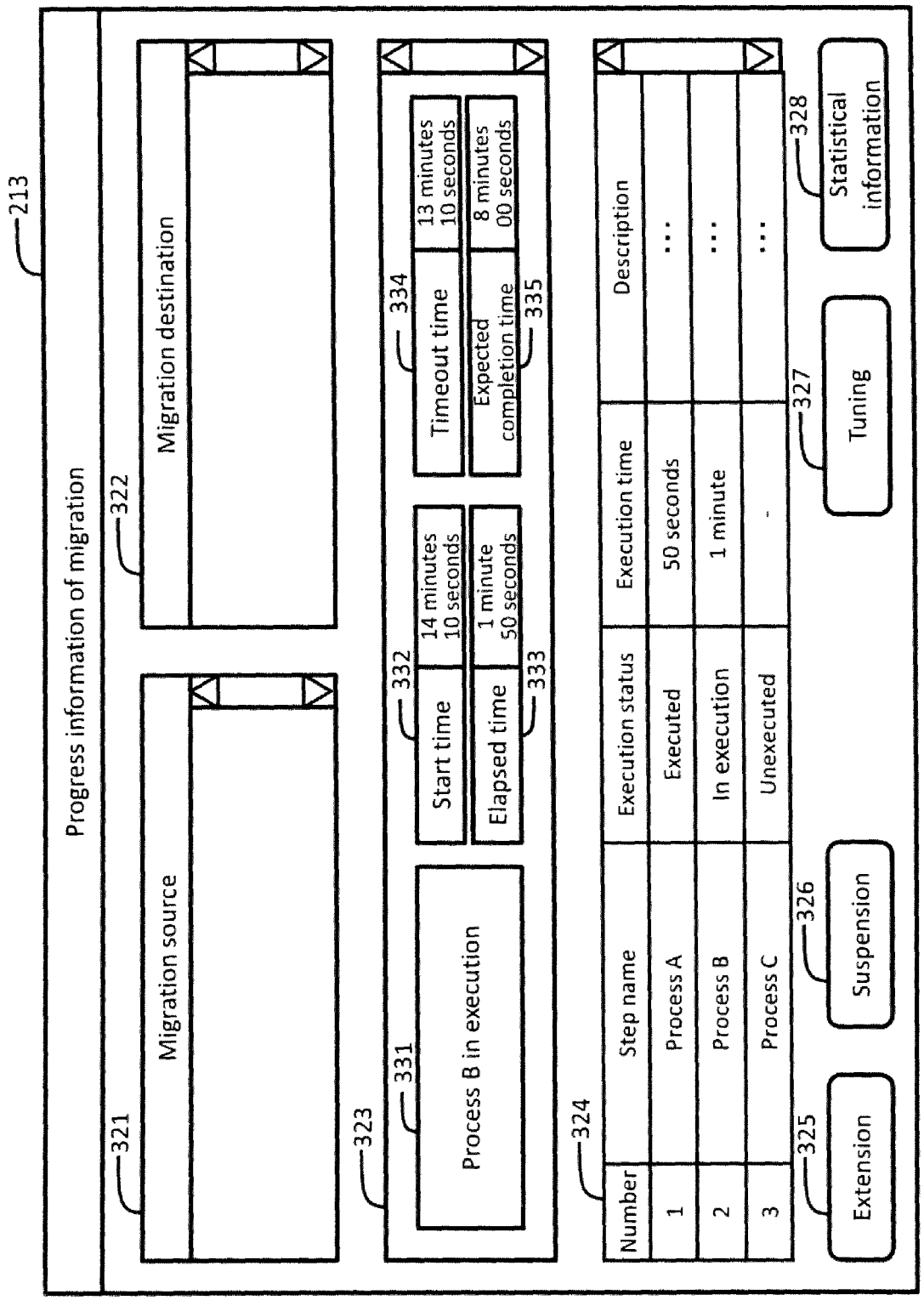
FIG. 7 is a view illustrating an example of a progress screen of the live migration.

FIG. 7 is a view illustrating an example of a progress screen of the live migration. For instance, when the execution button 306 is selected at the selection screen 211 illustrated in FIG. 5 and the live migration process is executed, data on an OS and a virtual memory included in the first LPAR 307 is all transferred to a virtual environment of the fourth LAPR. Furthermore, because of the "live" migration, even when being transferred, an OS and such included in the first LPAR 307 continue to be executed.

On the progress screen 213, progress information associated with the live migration in execution is displayed. The progress screen 213 includes: an LPAR information display area 321 of the migration source; an LPAR information display area 322 of the migration destination; a progress information display area 323; and a migration execution step display area 324. The progress screen 213 also includes: an extension button 325; a stop button 326; a tuning button 327; and a statistical information button 328.

In the LPAR information display area 321 of the migration source, LPAR information for specifying the LAPR of the migration source is displayed. In the LPAR information display area 322 of the migration destination, LPAR information for specifying the LPAR of the migration destination is displayed.

In the progress status display area 323, a progress situation of the live migration is displayed. Concerning a progress situation, for instance, a start time point 332 of a live migration process, elapsed time 333 from a start, expected remaining time (expected completion time) 335 to a completion of the live migration process, expected remaining time (timeout time) 334 to timeout, and a situation 331 of a process currently in execution and such are displayed.

The elapsed time 333 is acquired by calculating a finite difference between a time point when the execution button 306 is selected and a current time point of the management computer 2. The remaining time 334 to the timeout is acquired as a value acquired by subtracting the elapsed time 333 from a live migration process start from a timeout set value (fixed value).

In the execution step display area 324, already executed steps, step in execution, steps to be executed, and such in the live migration process are displayed in a list form. Then, for each step, a step name, an execution status of executed/in execution/unexecuted and such, time spent for execution (execution time), description of process content, and such are displayed.

When the extension button 325 is selected, the migration indication unit 203 extends timeout time of the live migration process. When the stop button 326 is selected, the migration indication unit 203 stops the live migration. When the tuning button 327 is selected, a transition to the setting screen 212 illustrated in FIG. 6 is made. Values set at the setting screen 212 to which the transition is made from the progress screen 213 are reflected in real time to the live migration process in execution. When the statistical information button 328 is selected, a transition is made to the statistics screen 214 described later.

As far as opportunities for a user to select the statistical information button 328 for displaying the statistics screen 214 are concerned, there are the following two, for instance.

A first example is a case where a user desires to confirm whether or not the live migration is completed according to a prior design before executing the live migration or to an estimation. Generally, a user estimates an approximate value of time required for a memory transfer in the live migration as a ratio of "a memory amount of a server/a memory transfer rate". Practically, because of existence of dirty pages, there may be a case where the time becomes longer than the value of the formula above. Therefore, to confirm whether the live migration process is proceeding according to the estimation, a user indicates a display of the statistics screen 214.

A second example is a case where a user desires to pursuit a cause when the live migration is not completed even after an expected completion time point, or to confirm current situation toward a planning of a countermeasure. A user indicate a display of the statistics screen 214 to confirm how the live migration is currently proceeding (whether it is taking time to transfer because a dirty page amount is larger than expected, or a transfer rate or an increase/decrease of dirty pages is an unanticipated value).

The conventional virtual computer systems do not provide a user with any means to know a current detailed situation of the live migration. Therefore, after a start of the live migration, the process reaches one of 1) a normal end, 2) an end in timeout (therefore, the live migration failed), or 3) a forced end (therefore, the live migration failed).

In contrast, on a virtual computer system of the present embodiment, since it is possible to know a current detailed situation of the live migration, even when ended normally, it becomes possible to analyze which situation of a) having a sufficient margin for a transfer rate and timeout time, or b) having almost no margin for the transfer rate and the timeout time, is closer. Or, even when timed out or cancelled, it is possible to analyze which situation of c) having a little more margin for the transfer rate or the timeout time so as to end normally, or d) having an insufficient transfer rate or timeout time, is closer.

In this manner, by knowing a situation of the live migration in execution, it is known that there is no problem in the case of a) above, but in the cases of b) to d) above, some countermeasures such as securing a sufficient margin is required.

In FIG. 7, when "estimated completion time>timeout time" is satisfied, there is a possibility that the live migration process is stopped depending on the timeout time before the live migration process is completed. For that reason, in such a case, such a warning screen is displayed in the display area 323. For instance, the expected completion time 335 is changed to conspicuous red or the like, which is different from ordinary colors. By displaying the warning screen, a user may notice that there is a possibility that the live migration process is not normally completed and may immediately take various measures.

For instance, a user may select the extension button 325 and extend the timeout time. For instance, a user may select the stop button 326 and stop the live migration process. For instance, a user may select the tuning button 327 and adjust a resource used for the live migration process. For instance, a user may select the statistical information button 328, confirm statistical information, and analyze a cause thereof.

Figure 8:
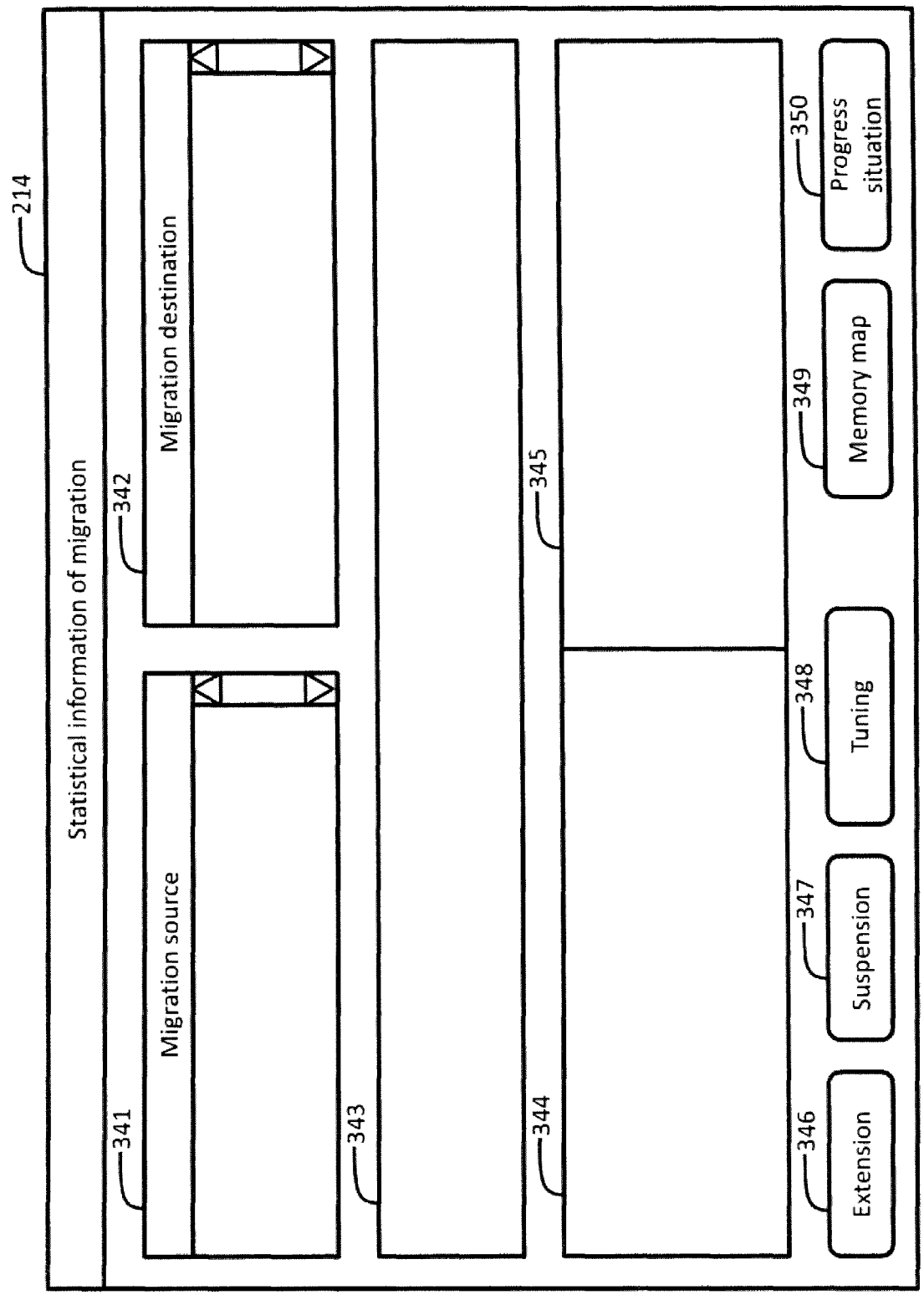
FIG. 8 is a view illustrating an example of a statistics screen of the live migration.

FIG. 8 is a view illustrating an example of the statistics screen 214 of the live migration. On the statistics screen 214, various statistical information concerning the live migration in execution is displayed.

The statistics screen 214 includes: an LPAR information display area 341 of the migration source; an LPAR information display area 342 of the migration destination; a statistical information display area 343; a transfer rate graph display area 344; and a dirty page amount graph display area 345.

The statistics screen 214 includes: an extension button 346; a stop button 347; a tuning button 348; a memory map button 349; and a progress status button 350. Concerning the extension button 346, the stop button 347, and the tuning button 348, since they are similar to what is described above, descriptions are omitted. When the progress status button 350 is selected, the process returns to the progress screen 213 illustrated in FIG. 7. When the memory map button 349 is selected, the memory map screen 215 is displayed.

In the live migration, memory content of the migration source computer is transferred to a memory of the migration destination computer. In that process, dirty pages must be taken into consideration. In other words, whether or not transfer of the dirty pages may be completed is an important point for whether the live migration is completed within the predetermined time.

To securely complete a transfer of dirty pages, knowing a status of a memory of the migration source computer on which the live migration is being executed becomes necessary. In that case, it is very important to grasp a status of memory use, specifically how frequently and which program is accessing in addition to statistical and quantitative information such as the transfer rate or a remaining amount of dirty pages. Knowing the status of the memory use assists to determine where a cause of generating dirty pages lies, for instance, whether the cause lies in a kernel area of an OS or an application area.

By comprehensively referring to such information as to be acquired from the memory map screen 215, it becomes possible to determine which of a plurality of set values associated with the live migration process should be changed to complete the live migration within the predetermined time. The determination may be made by a user or may automatically be made by the management computer 2 and such.

In the LPAR information display area 341 of the migration source, the status management information 101 of the LAPR in execution of the migration source is displayed. In the LPAR information display area 342 of the migration destination, the status management information 101 of the LAPR in execution of the migration destination is displayed.

In the statistical information display area 343, statistical information concerning the migration in execution is displayed in a table form. Next, a description is made concerning the statistical information.

FIG. 9 is a view illustrating an example of a table of statistical information displayed in the statistical information display area 343.

The statistical information 103 displays as data items a time point 131, a transfer rate 132, an average transfer rate 133, a dirty page amount 134, an increase/decrease 135 of the dirty page amount, a total transfer amount 136, and a determination threshold 137.

The time point 131 is a time point whose statistical information 103 is acquired from the computer 4. The transfer rate 132 represents a transfer rate of transfer data from the migration source to the migration destination. The transfer rate 132, for instance, may be calculated on the basis of data amount output from the communication IF 25 of the computer 4 of the migration source. A graph displayed in the transfer rate graph display area 344 described later is generated on the basis of a value of the transfer rate 132. The average transfer rate 133 represents an average of the transfer rates 132 of transfer data at predetermined time.

The dirty page amount 134 represents a remaining dirty page amount. The dirty page amount graph display area 345 described later is generated on the basis of a value of the dirty page amount 134.

The increase/decrease 135 of a dirty page amount, for instance, represents an increase/decrease value between the dirty page amount 104 associated with the previous statistical information 103 and the dirty page amount 104 associated with the present statistical information 103.

The total transfer amount 136 represents a data amount whose transfer is already completed. The determination threshold 137 is a threshold for determining whether or not to start a final process of the live migration. The determination threshold 137 corresponds to a determination threshold of the status management information 101.

Figure 10:
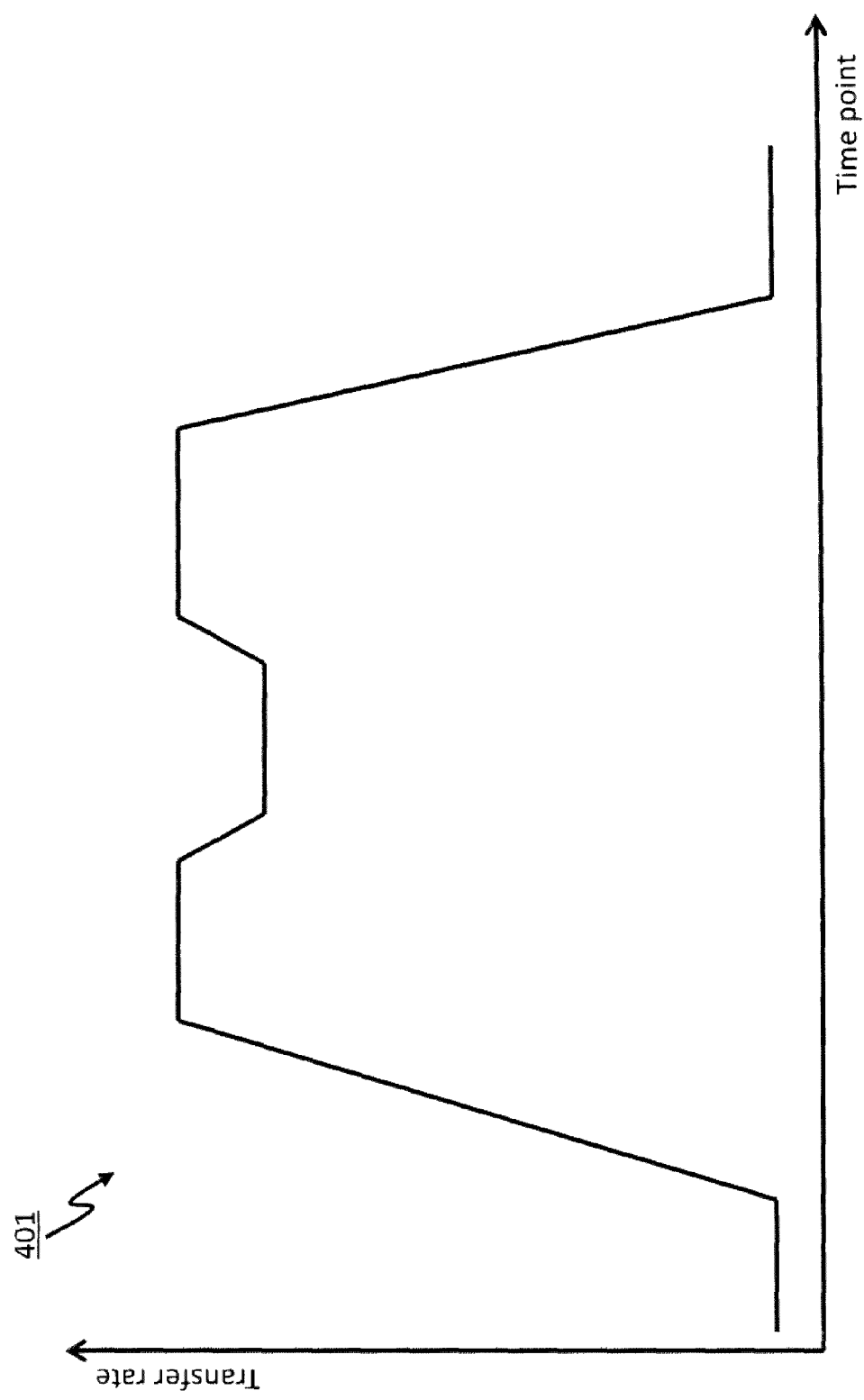
FIG. 10 is a graph of a transfer rate displayed on the statistics screen.

FIG. 10 is an example of a graph 401 of a transfer rate displayed in the transfer rate graph display area 344. In the graph 401 of the transfer rate, the horizontal axis represents time, and the vertical axis represents the transfer rate. In other words, a user may know from the graph 401 how the transfer rate of the transfer data varies with time.

For instance, even when the transfer rate becomes slow during a certain time slot, when it recovers afterward, a user may analyze that there is no problem in a communication path between the migration source and the migration destination. However, when the transfer rate becomes slower from a certain time point and does not recover afterward, a user may analyze that there may be a problem in the communication path between the migration source and the migration destination.

Figure 11:
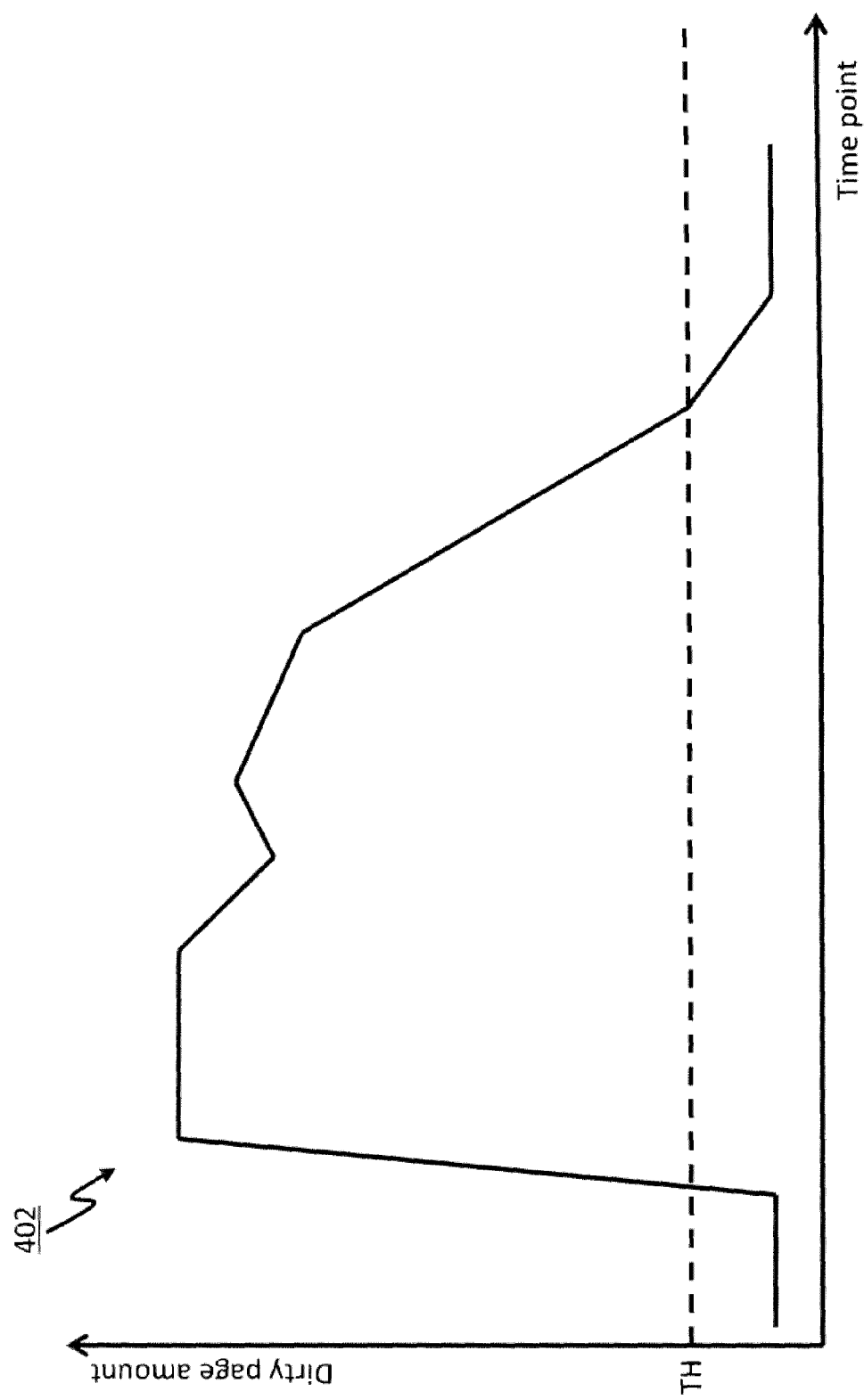
FIG. 11 is a graph of a dirty page amount displayed on the statistics screen.

FIG. 11 is a graph 402 of a dirty page amount displayed in the dirty page amount graph display area 345. In the graph 402 of the dirty page amount, the horizontal axis represents time, and the vertical axis represents the dirty page amount. In other words, a user may know from the graph 402 how the dirty page amount varies with time.

For instance, when the dirty page amount tends to decrease with time, a user may analyze that the migration process is going well. However, when the dirty page amount does not decrease or the dirty page amount tends to increase, a user may analyze that it may take time to complete the migration process.

When there is a problem in a progress of the live migration process, by analyzing both the graph 401 of the transfer rate and the graph 402 of the dirty page amount, the causes may be determined to a certain extent. Thereby, a user may properly deal with the problem.

For instance, when the dirty page amount tends to decrease but the transfer rate is slow, a user may analyze that there may be a cause in a communication path between the migration source and the migration destination. Then, the user may deal with the problem by, for instance, stopping other application that exclusively occupies a traffic of the communication path.

For instance, when the transfer rate is high enough but the dirty page amount does not decrease, a user may analyze that a cause may lie on the OS in execution on the migration source LPAR. Then, for instance, a user may cope with the problem by, for instance, stopping an application that is frequently accessing a virtual memory on the OS of the LPAR. Or, a user may select the tuning button 348, display the setting screen 212, and adjust a resource required for the live migration process. Or, a user may select the memory map button 349, display the memory map screen 215 described later, and further analyze in detail.

In the present embodiment, in accordance with an idea that a change in the dirty page amount influences on a change in the transfer rate, the graph 402 illustrating the change in the dirty page amount as well as the graph 401 illustrating the change in the transfer rate are displayed. As a cause of the change in the transfer rate, a cause other than the change in the dirty page amount, that is to say, a change in status information other than the dirty page amount may be considered. For this reason, as a graph for assisting a user to speculate a cause of the change in the transfer rate, in place of or in addition to the graph illustrated in FIG. 11, a graph that indicates a change in measured values of the status information different from the dirty page amount may be displayed.

Figure 12:
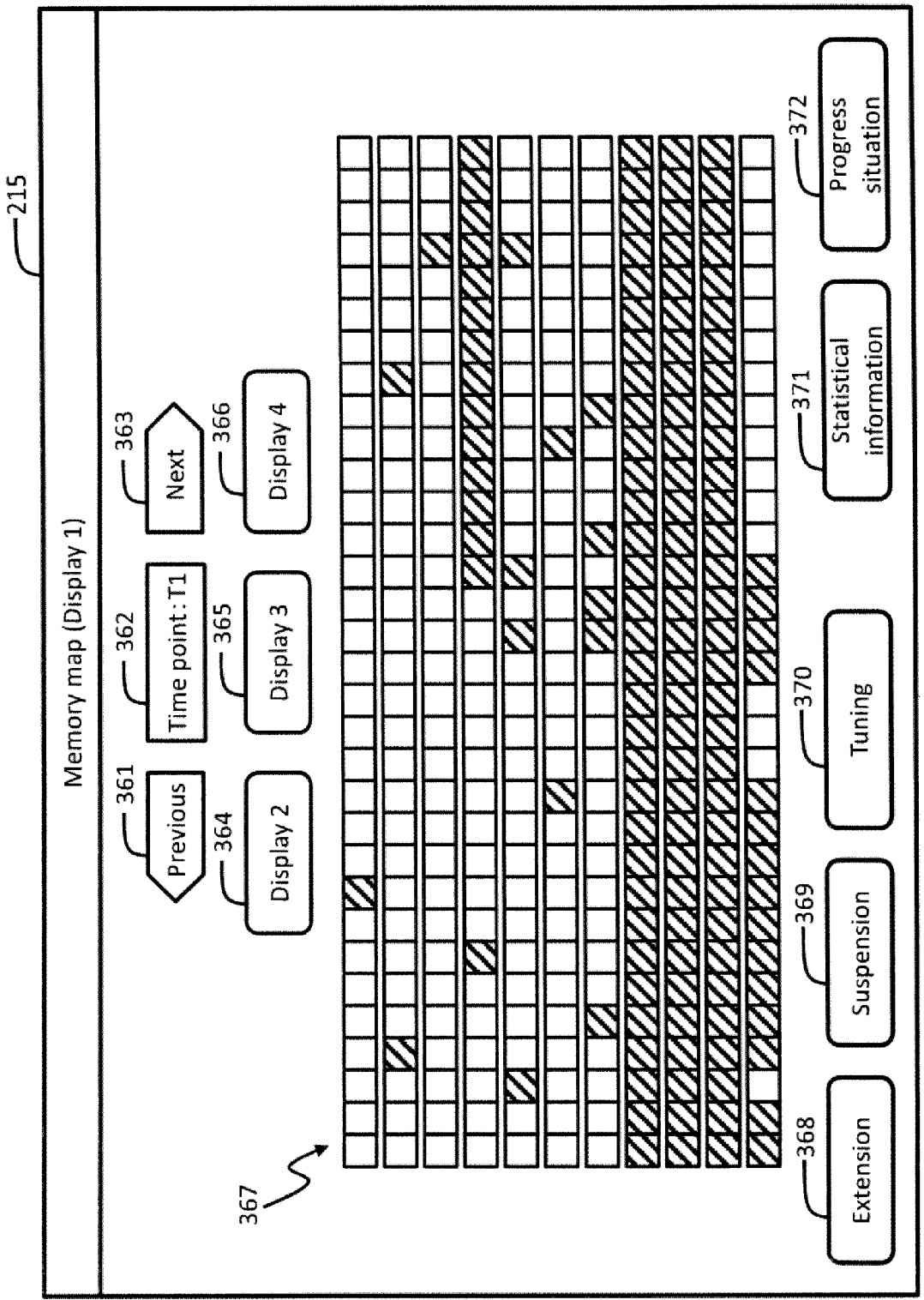
FIG. 12 is a view illustrating an example of a memory map screen.

FIG. 12 is a view illustrating an example of the memory map screen 215. The memory map screen 215 illustrates a status of dirty pages.

The memory map screen 215 includes: a previous button 361; a time point display area 362; a next button 363; a display selection buttons 364, 365, and 366; and a memory map display area 367.

In the time point display area 362, a time point corresponding to a memory map to display in the memory map display area 367 is displayed. The previous button 361, when selected, a memory map of the previous time point, if it exists, is displayed in the memory map display area 367. The next button 363, when pressed, a memory map of the next time point, if it exists, is displayed in the memory map display area 367.

The display selection buttons 364, 365, and 366, when selected, display a memory map in the memory map display area 367 in a display method corresponding to each button. The memory map shown in the memory map display area 367 in FIG. 12 corresponds to the first display described later. Hereinafter, a description is made concerning generation and display of memory maps corresponding to the first display, a second display, a third display, and a fourth display.

Figure 13:
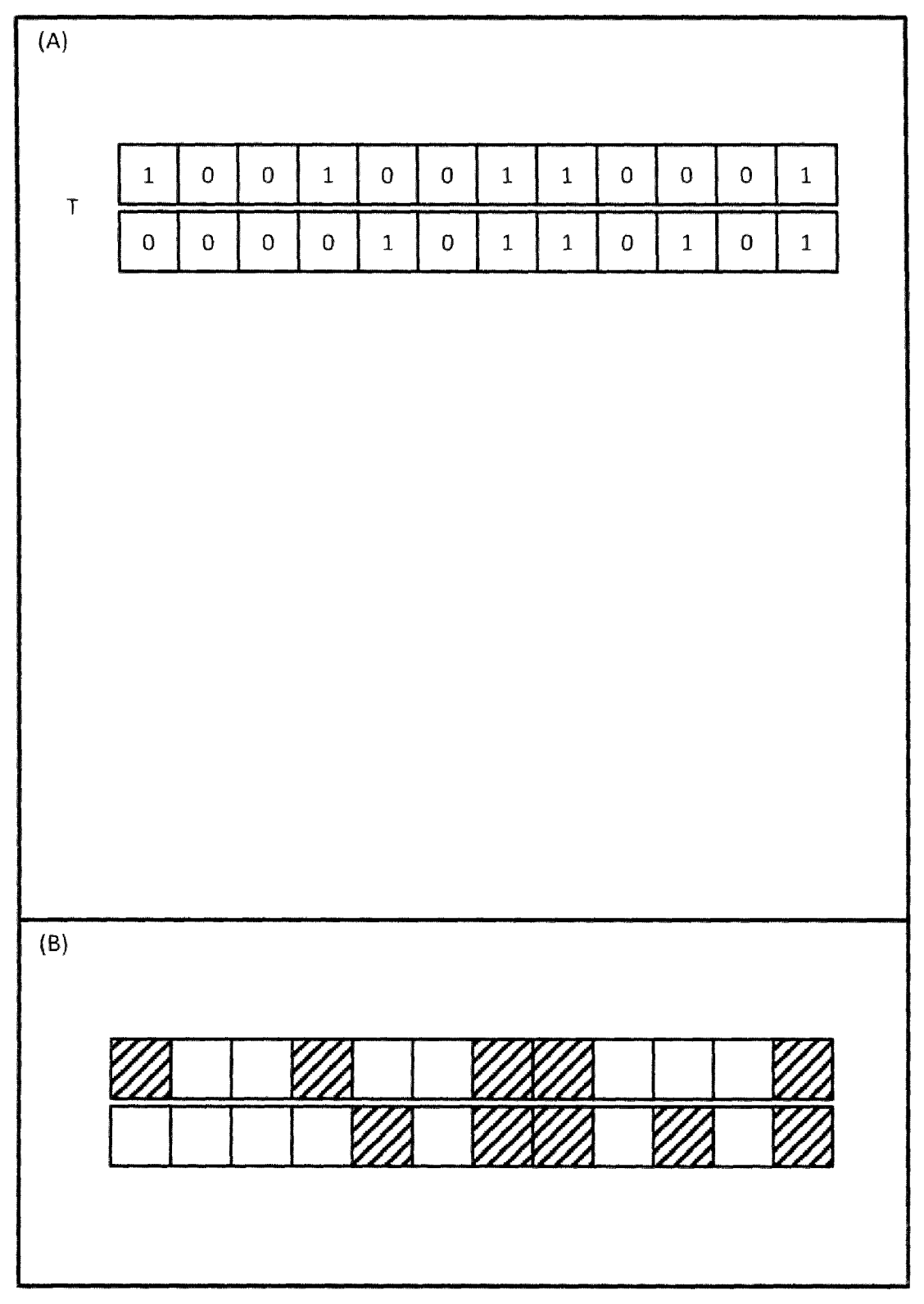

FIG. 13 is a view illustrating an example of generation and display of a display associated with the first display. The first display displays a status of the dirty pages at a certain time point as a graphical memory map.

FIG. 13 (A) illustrates a status of the dirty pages at time point T. The time point T represents a time point when the status of the dirty pages is checked. The status of the dirty pages is managed by the memory management information 102 of the hypervisor 23 of the computer 4. In the rewrite flag 124 of the memory management information 102 illustrated in FIG. 2, a page of a value "1" is a dirty page and a page of a value "0" is a page that is not a dirty page (hereinafter, referred to as a "clean page").

FIG. 13 (A) is a view in which the rewrite flag 124 of the memory management information 102 is illustrated. In FIG. 13 (A) also, a page of a value "1" is a dirty page and a page of a value "0" is a clean page.

The first display displays the status of the dirty pages illustrated in FIG. 13 (A) as a graphical memory map illustrated in FIG. 13 (B) in the memory map display area 367 of FIG. 12. Each of individual elements of the memory map illustrated in FIG. 13 (B) may be called a map element. A memory map includes a plurality of map elements corresponding to each of the pages constituting the memory. Each map element, for instance, is an area (a rectangular area in the illustrated example). A memory map associated with the first display is displayed in two-level gradation, for instance, a memory element corresponding to a dirty page (that is to say, a page of a value "1") with half-tone dot meshing and a clean page (that is to say, a page of a value "0") without half-tone dot meshing.

A user may confirm at a glance by the memory map associated with the first display how many dirty pages remain in which part of the memory at a certain time point.

Figure 14:
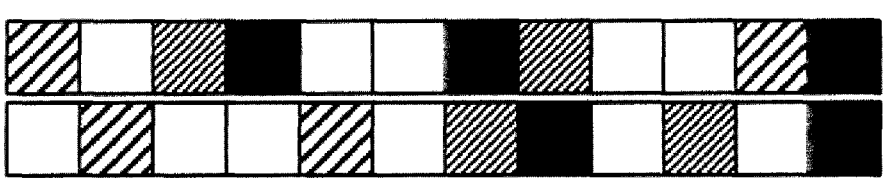
FIG. 14 is a view illustrating an example of generation and display of a memory map corresponding to a second display.

FIG. 14 is a view illustrating an example of generation and display of a memory map corresponding to the second display. The second display displays a frequency status of the dirty pages at a certain time slot as a graphical memory map.

FIG. 14 (A) is a view illustrating a status of dirty pages at time points T3, T2, and T1 (T3>T2>T1). Each of the time points T3, T2, and T1 is a time point at which a status of respective dirty pages are checked. Each of the statuses of the dirty pages is managed by the hypervisor 23 of the computer 4. Here, a page of a value "1" is a dirty page and a page of a value "0" is not a dirty page.

In FIG. 14 (B), a value of each of the pages ("0" or "1") at time points T3, T2, and T1 are summed up for calculation. This is called a frequency status of the dirty pages. For instance, when a certain page is "1" at any of the time points T3, T2, or T1, the page is made to be "3". Similarly, when a certain page is "0" at any of the time points T3, T2, or T1, the page is made to be "0". In other words, in the frequency status of the dirty pages, a page of a large value indicates that the page is updated more frequently. The frequency status of the dirty pages is calculated by using statuses of a plurality of dirty pages which the management computer 2 acquires at different time points from the computer 4 of the migration source.

The second display displays the frequency status of the dirty pages illustrated in FIG. 14 (B) as a graphical memory map as illustrated in FIG. 14 (C) in the memory map display area 367 of FIG. 12. A memory map associated with the second display is displayed in multi-level gradation, for instance, a part of a value "0" without half-tone dot meshing, a part of a value "1" with light half-tone dot meshing, a part of a value "2" with dark half-tone dot meshing, and a part of a value "3" blackened.

A user may confirm at a glance by the memory map associated with the second display which pages are updated how frequently at a certain time slot.

Figure 15:
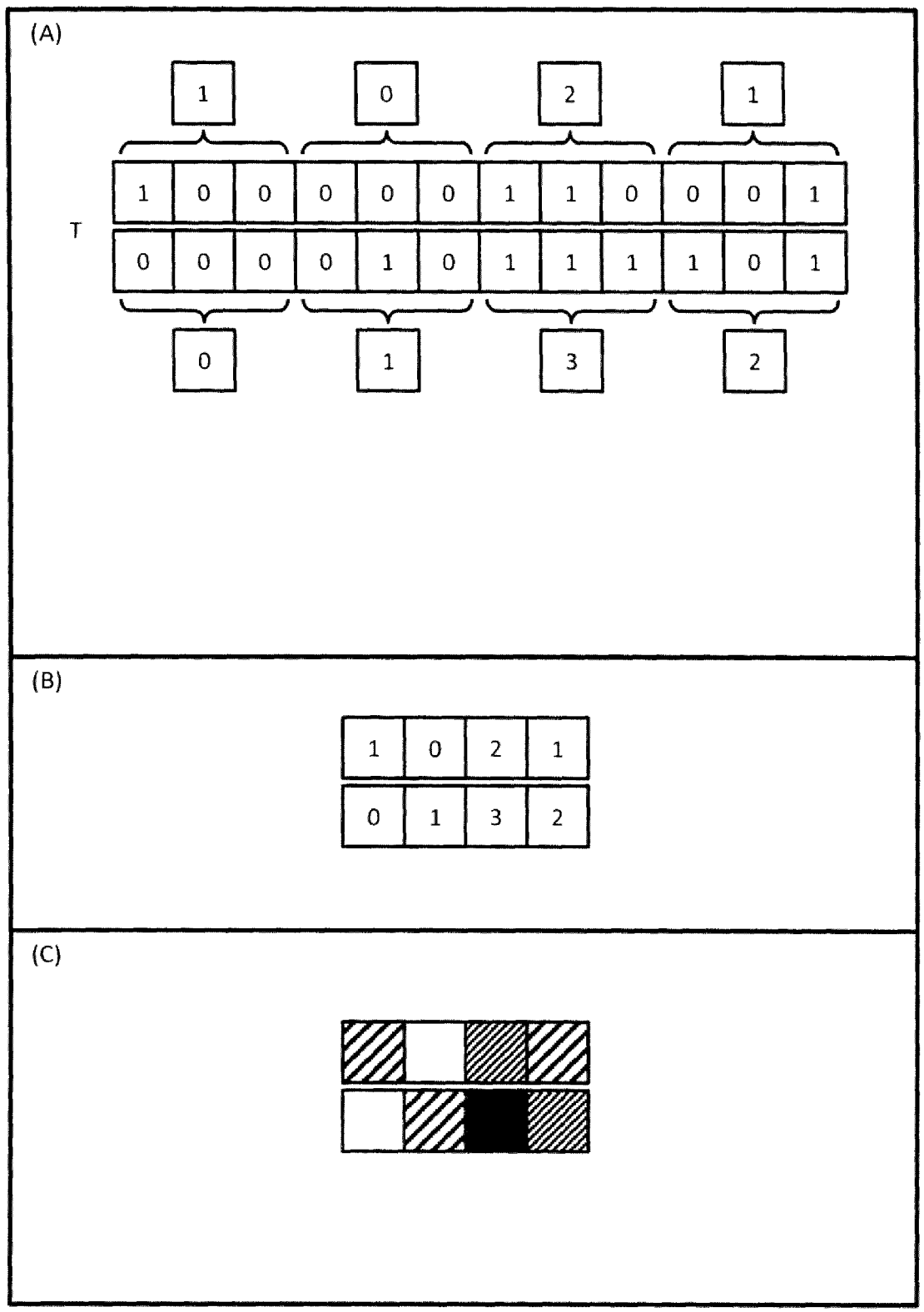
FIG. 15 is a view illustrating an example of generation and display of a memory map corresponding to a third display.

FIG. 15 is a view illustrating an example of generation and display of a memory map corresponding to the third display. The third display displays an outline status of dirty pages at a certain time point as a graphical memory map.

FIG. 15 (A) is a view illustrating a status of the dirty pages at a time point T. The time point T is a time point when the status of the dirt pages is checked. Here, a page of a value "1" is a dirty page, and a page of a value "0" is not a dirty page.

FIG. 15 (B) is calculated by summing up values of three pages. This is an outline status of the dirty pages. For instance, when values of 3 pages from a top of the memory are "1", "1", and "0", respectively, one page having "2" is generated by summing them up. After that, this process is repeated for every three pages and an outline status of the dirty pages as illustrated in FIG. 15 (B) is generated. The outline status of the dirty pages is managed by the hypervisor 23 of the computer 4.

The third display displays the outline status of the dirty pages illustrated in FIG. 15 (B) as a graphical memory map as illustrated in FIG. 15 (C) in the memory map display area 367 of FIG. 12. A memory map associated with the third display is displayed in multi-level gradation, for instance, a part of a value "0" without half-tone dot meshing, a part of a value "1" with light half-tone dot meshing, a part of a value "2" with dark half-tone dot meshing, and a part of a value "3" blackened.

By converting the status illustrated in FIG. 15 (A) into the outline status of the dirty pages illustrated in FIG. 15 (B), a data amount managed by the hypervisor 23 may be reduced. Furthermore, the management computer 2 may reduce a communication data amount between the management computer 2 and the computer by acquiring an outline status of the memory map from the computer 4.

Figure 16:
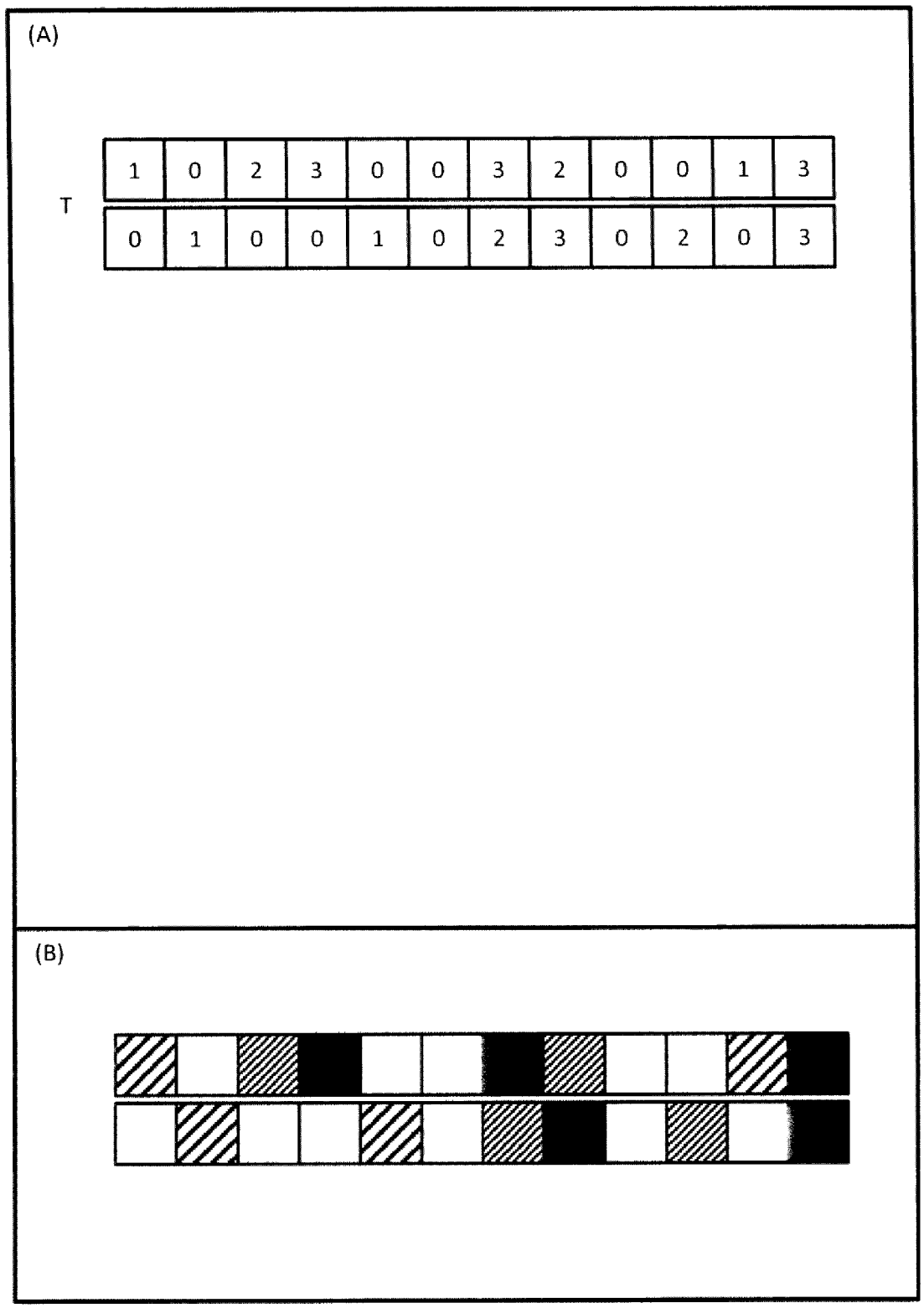
FIG. 16 is a view illustrating an example of generation and display of a memory map corresponding to a fourth display.

FIG. 16 is a view illustrating an example of generation and display of a memory map corresponding to the fourth display. The forth display displays the number of updates at a certain time slot as a graphical memory map.

FIG. 16 (A) represents the number of memory updates from a certain time point to a time point T. The number of memory updates is managed by the hypervisor 23 of the computer 4. Here, a value of each page represents the number of times by which the page is updated. For instance, a page of a value "3" represents that the page is updated three times during the time slot.

The fourth display displays the number of memory updates illustrated in FIG. 16 (A) as a graphical memory map as illustrated in FIG. 16 (B) in the memory map display area 367 of FIG. 12. A memory map associated with the fourth display is displayed in multi-level gradation, for instance, a part of a value "0" without half-tone dot meshing, a part of a value "1" with light half-tone dot meshing, a part of a value "2" with dark half-tone dot meshing, and a part of a value "3" blackened.

A user may confirm at a glance by the memory map associated with the fourth display which pages are updated how frequently during a certain time slot.

Figure 17:
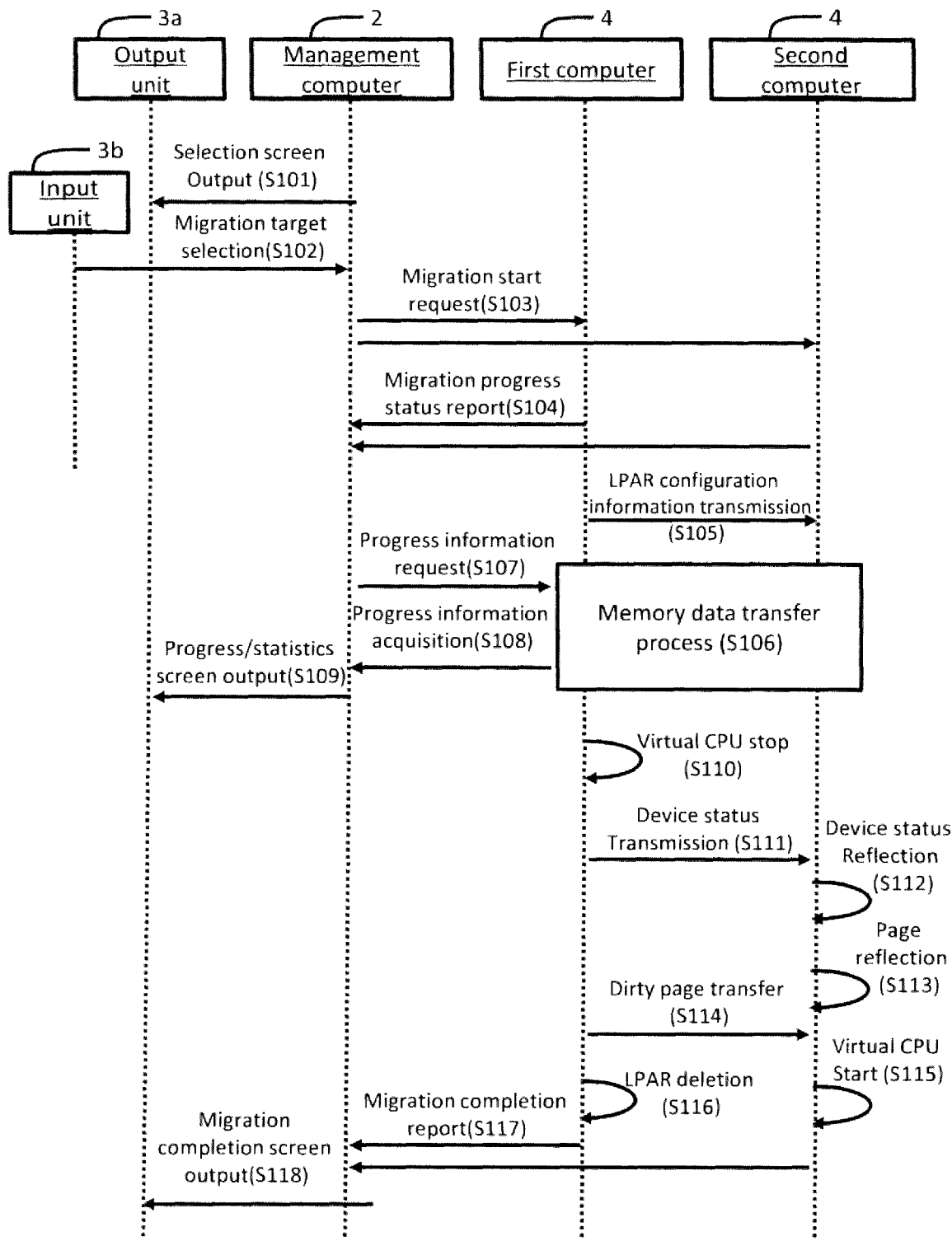
FIG. 17 is a sequence chart of a live migration process.

FIG. 17 is a sequence chart of the live migration process. Hereinafter, by using FIG. 17, a process among the management computer 2, the first computer 4-1, and the second computer 4-2 is described.

The screen input/output unit 201 of the management computer 2 outputs the selection screen 211 to the output unit 3b (S101). A user selects the first LPAR 307 as the migration source and the fourth LPAR 308 as the migration destination through the input unit 3a at the selection screen 211 displayed at the output unit 3b, and selects the execution button 306. A selection result of the LPAR is conveyed to the management computer 2 (S102).

The migration indication unit 203 of the management computer 2 requests the first computer 4-1 of the migration source and the second computer 4-2 of the migration destination for a start of the live migration process (S103). The first computer 4-1 and the second computer 4-2 properly (for instance, periodically) report a migration progress status (for instance, a current execution step and a status) to the management computer 2 (S104).

The hypervisor 23 of the first computer 4-1 transmits configuration information of the first LPAR 307 of the migration source to the second computer 4-2 (S105). The hypervisor 23 of the second computer 4-2 defines an LPAR which is to be the migration destination on the basis of the configuration information received from the first computer 4-1. Then, the hypervisor 23 of the first computer 4-1 executes a memory data transfer between the second computer 4-2 (S106). The detail of the process is described later.

The hypervisor 23 of the management computer 2 requests to the first computer 4-1 as needed information concerning a transfer status (S107). The hypervisor 23 of the first computer 4-1 transmits the information concerning the transfer status by answering the request (S108).

The screen generation unit 202 of the management computer 2 generates the progress screen 213 and the statistics screen 214 by using acquired information concerning the transfer status and outputs to the output unit 3b (S109).

The hypervisor 23 of the first computer 4-1, when completing a memory data transfer process and starting the final process of the migration, stops a virtual CPU of the LPAR of the migration source (S110). The hypervisor 23 of the first computer 4-1 acquires a device status of the LPAR of the migration source and transmits the status to the LPAR of the migration destination of the second computer 4-2 (S111). The hypervisor 23 of the second computer 4-2 reflects the device status received from the first computer 4-1 to the LPAR of the migration destination (S112).

The hypervisor 23 of the first computer 4-1 transfers a remaining dirty pages to the second computer 4-2 (S112). The hypervisor 23 of the second computer 4-2 reflects the dirty pages received from the first computer 4-1 to the memory of the LPAR of the migration destination (S113). The hypervisor 23 of the second computer 4-2 starts a virtual CPU of the LPAR of the migration destination and start execution of the LPAR of the migration destination (S115). The hypervisor 23 of the first computer 4-1 deletes the LPAR of the migration source (S116).

The hypervisors 23 of the first computer 4-1 and the second computer 4-2 report to the management computer 2 that the live migration process is completed (S117). The screen generation unit 202 of the management computer 2 receives the completion report and generates and outputs to the output unit 3b a completion screen of the live migration process (S118).

Figure 18:
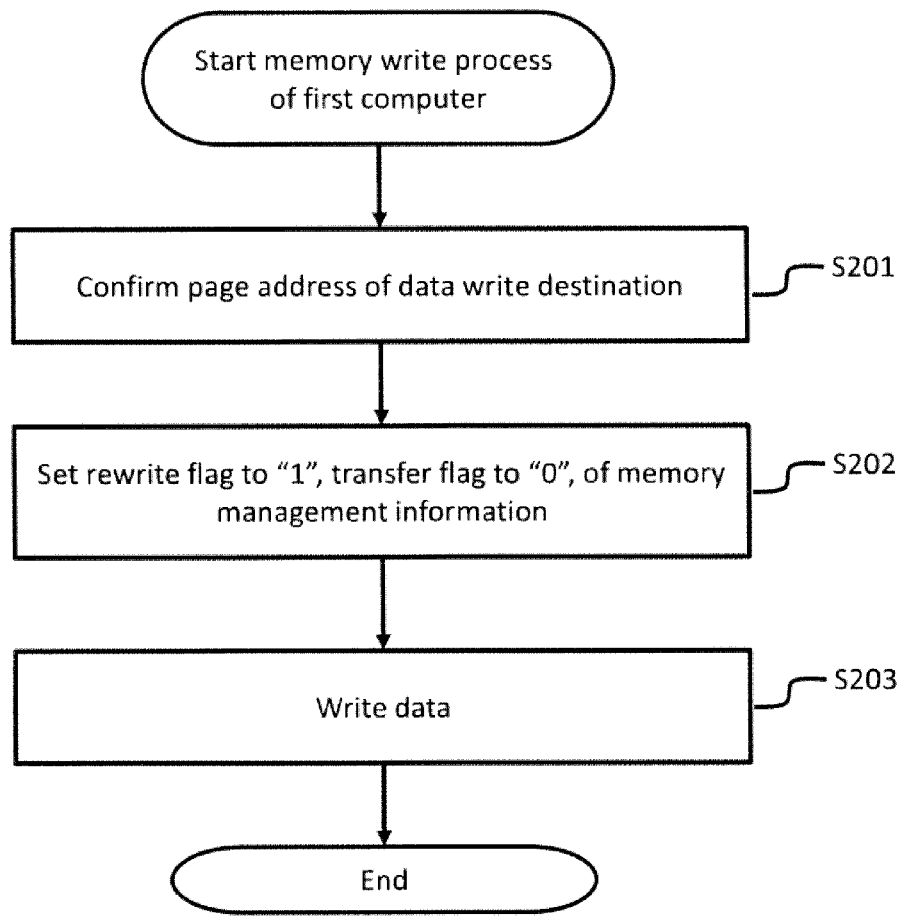
FIG. 18 is a flow chart of a memory write process of a first computer.

FIG. 18 is a flow chart of a memory write process of the first computer 4-1. The hypervisor 23 of the first computer 4-1 confirms a page address of the data write destination (S201). The hypervisor 23 of the first computer 4-1 sets the rewrite flag of the memory management information 102 corresponding to the page address of the data write destination to "1" and the transfer flag to "0" (S202). In other words, the hypervisor 23 of the first computer 4-1 registers that the memory page is rewritten and locks a data transfer of the memory page that is being rewritten. Then, the hypervisor 23 of the first computer 4-1 writes data to the memory page corresponding to the page address of the write destination (S203).

Figure 19:
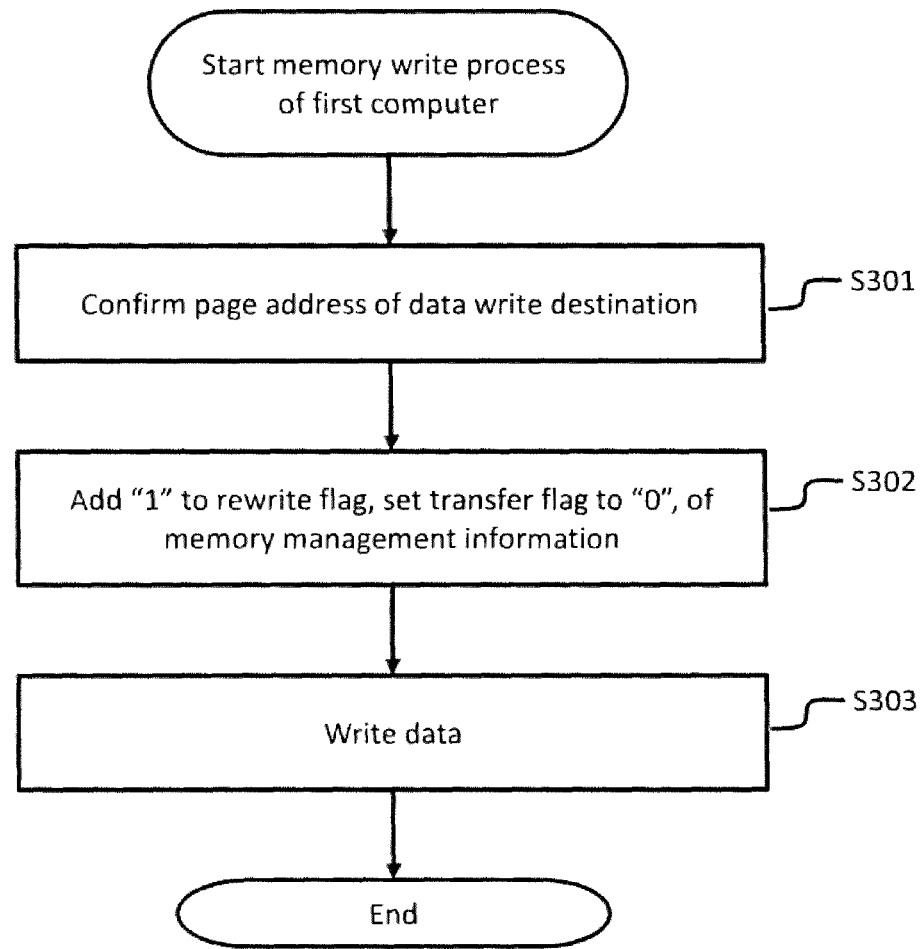
FIG. 19 is a view illustrating a modified example of a flow chart of the memory write process of the first computer.

FIG. 19 is a view illustrating a modified example of the flow chart of the memory write process of the first computer 4-1. The flow chart is a modified example of the process illustrated in FIG. 18.

The hypervisor 23 of the first computer 4-1 confirms a page address of a data write destination (S301). The hypervisor 23 of the first computer 4-1 adds "1" to a rewrite flag of the memory management information 102 corresponding to the page address of the data write destination and sets a transfer flag to "0" (S202). In other words, a value of the rewrite flag is added every time when being rewritten. The first computer 4-1 writes data to a memory page corresponding to the page address of the write destination (S403).

Figure 20:
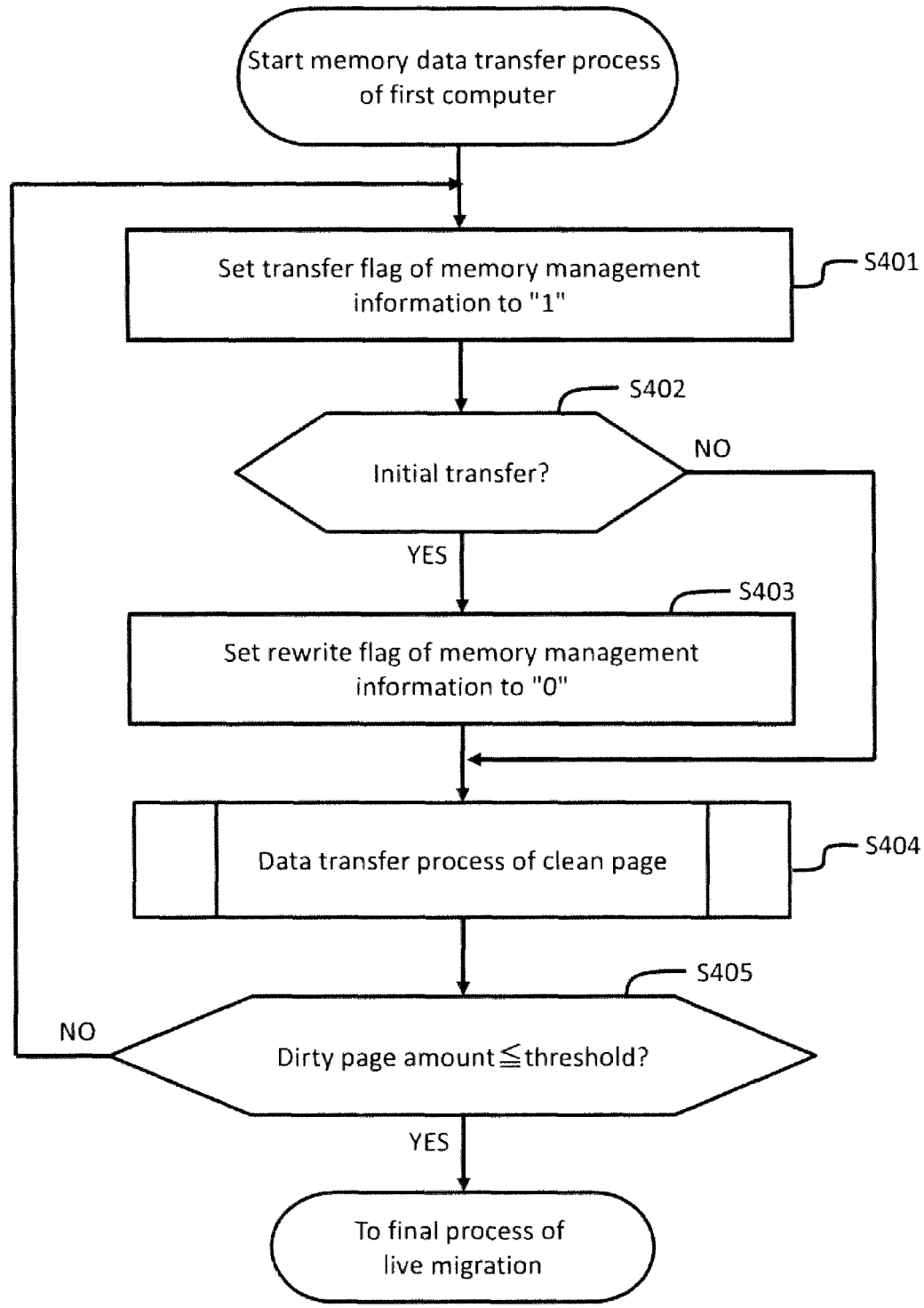
FIG. 20 is a flow chart of a memory data transfer process of the first computer.

FIG. 20 is a flow chart of a memory data transfer process of the first computer 4-1. The flow chart is a process of the first computer 4-1 in the memory data transfer process (S106) of the sequence chart illustrated in FIG. 17.

The hypervisor 23 of the first computer 4-1 sets the transfer flag of the memory management information 102 to "1" (S401). In other words, the hypervisor 23 of the first computer 4-1 release the lock of the data transfer of the memory to be transferred.

The hypervisor 23 of the first computer 4-1 determines whether or not the first transfer process is initial (S402). In other words, the hypervisor 23 of the first computer 4-1 determines that the process is not a process after returning from a step S405.

When the process is not the initial transfer (S402:NO), the hypervisor 23 of the first computer 4-1 proceeds to a process of a step S404. When the process is the initial transfer (S402: YES), the hypervisor 23 of the first computer 4-1 sets a rewrite flag of the memory management information 102 to "0" (S403).

Then, the hypervisor 23 of the first computer 4-1 executes a data transfer process of a clean page (S404). The detail of the process is described later.

The hypervisor 23 of the first computer 4-1 determines whether or not "a dirty page amount is equal to or less than a threshold value" (S405). The threshold is a determination threshold at the status management information 101 of FIG. 3. When "the dirty page amount is equal to or less than the threshold" (S405:YES), the hypervisor 23 of the first computer 4-1 ends the process and proceeds to a final process of the live migration. When "dirty page amount>threshold" (S405:NO), the hypervisor 23 of the first computer 4-1 returns to the process of the step S401.

Figure 21:
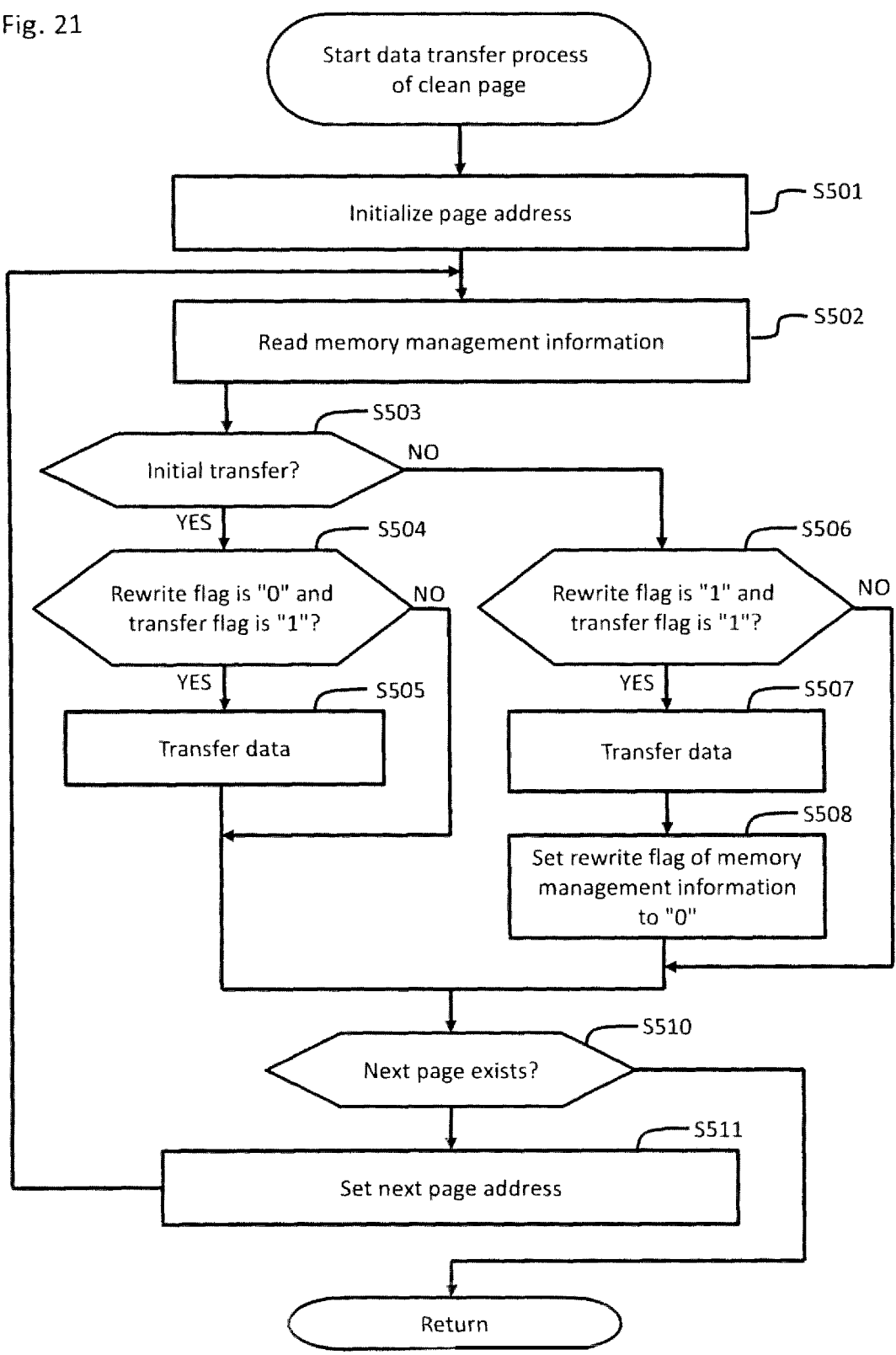
FIG. 21 is a view illustrating an example of a clean page data transfer process of the first computer.

FIG. 21 is a flow chart of a data transfer process of pages other than dirty pages of the first computer 4-1. The process corresponds to a data transfer process (S404) of pages other than the dirty pages of the flow chart illustrated in FIG. 20.

The hypervisor 23 of the first computer 4-1 initializes addresses (S501). The hypervisor 23 of the first computer 4-1 reads the memory management information 102 (S502).

The hypervisor 23 of the first computer 4-1 determines whether or not the transfer is initial (S503). At first, a case where the transfer is initial (S503:YES) is described.

The hypervisor 23 of the first computer 4-1 determines whether or not the rewrite flag is "0" and the transfer flag is "1" (S504). In other words, the hypervisor 23 of the first computer 4-1 determines whether a rewrite does not occur and a transfer is permitted.

When the determination in the step S504 is negative (S504: NO), the hypervisor 23 of the first computer 4-1 proceeds directly to a process of a step S510. In other words, the hypervisor 23 of the first computer 4-1 does not perform a data transfer.

When the determination in the step S504 is positive (S504: YES), the hypervisor 23 of the first computer 4-1 transfers data of the memory page to the second computer 4-2 (S505) and proceeds to a process of a step S510.

Next, a case where a transfer is not initial (S503:NO) in the determination of the step S503 is described.

The hypervisor 23 of the first computer 4-1 determines whether the rewrite flag is "1" and the transfer flag is "1" (S506). In other words, the hypervisor 23 of the first computer 4-1 determines whether data is rewritten and a transfer is permitted.

When the determination of the step S506 is negative (S506: NO), the hypervisor 23 of the first computer 4-1 proceeds directly to the process of the step S510. In other words, the hypervisor 23 of the first computer 4-1 does not perform a data transfer.

When the determination of the step S506 is positive (S506: YES), the hypervisor 23 of the first computer 4-1 transfers data of the memory page to the second computer 4-2 (S507). Then, the hypervisor 23 of the first computer 4-1, since the transfer of the rewritten data is completed, sets the rewrite flag of the memory management information 102 to "0" and proceeds to the process of the step 510.

In the step 510, the hypervisor 23 of the first computer 4-1 determines whether or not the next memory page to be transferred exists (S510). When the next memory page to be transferred exists (S510:YES), the hypervisor 23 of the first computer 4-1 sets an address of the next memory page to be transferred (511), and returns to the process of the step S502. When the next memory page to be transferred does not exist (S510:NO), the hypervisor 23 of the first computer 4-1 ends the process and proceeds to steps of the S404 and later illustrated in FIG. 20.

Figure 22:
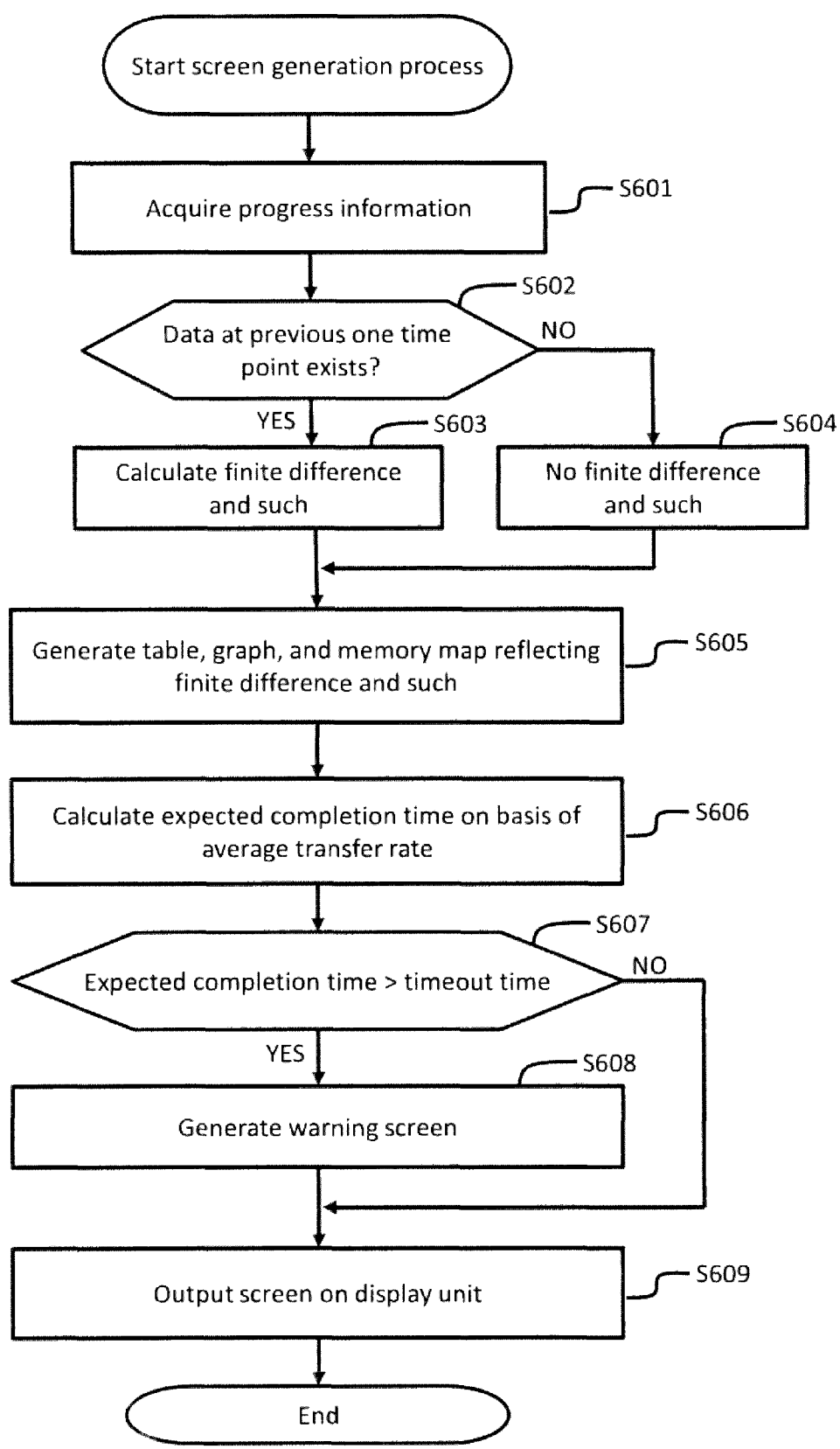
FIG. 22 is a flow chart of a screen generation process of the management computer.

FIG. 22 is a flow chart of a generate process of the progress screen 213 and the statistics screen 214 in the management computer 2.

The screen generation unit 202 of the management computer 2 acquires progress information from the first computer 4-1 (S601). The progress information retains the status management information 101 and the memory management information 102 of the first computer 4-1 at a time point when the acquisition is executed. The screen generation unit 202 of the management computer 2 determines whether or not the previous progress information exists (S602).

When the previous progress information does not exist (S602:NO), the screen generation unit 202 of the management computer 2 determines that there is no difference or the like, and proceeds to a process of a step S605. When the previous progress information exists (S602:YES), the screen generation unit 202 of the management computer 2 calculates a finite difference between the previous progress information and progress information acquired this time (S603), and proceeds to the process of the step S605.

The screen generation unit 202 of the management computer 2 generates a table of statistical information, a graph, a memory map, and such on the basis of the finite differences and such calculated in the step S603 (S605). Next, the generation thereof is further described.

The status management information 101 contained in the progress information includes the transferred data amount 115d, which is a total amount of data whose transfer is completed by that time point (refer to FIG. 3). Therefore, the screen generation unit 202 may acquire a data transfer amount during a time slot from a previous one to the this time one by calculating a finite difference between the previous transferred data amount 115d and a transferred data amount 115d of this time. The screen generation unit 202 may acquire a data transfer rate during the time slot by calculating "a data transfer amount/a time slot". The screen generation unit 202 generates a table and the graph 401 on the basis of the data transfer amount and the data transfer rate.

The status management information 101 contained in the progress information includes the dirty page amount 115e at the time point (refer to FIG. 3). Therefore, the screen generation unit 202 may acquire an amount of increase/decrease of the dirty pages during a time slot from the previous to the this time by calculating a finite difference between the previous dirty page amount 115e and the dirty page amount 115e of this time. The screen generation unit 202 may acquire a speed of increase/decrease of the dirty page amount during the time slot by calculating "increase or decrease of a dirty page amount/time slot". The screen generation unit 202 generates a table and the graph 402 on the basis of the increase/decrease amount of the dirty pages and the increase/decrease speed of the dirty pages.

The memory management information 102 contained in the progress information includes a value of the rewrite flag 124 of each page at the time point (in other words, a status of the dirty pages). The screen generation unit 202 generates a memory map at the time point by using the value of the rewrite flag 124. The screen generation unit 202 may generate a memory map as illustrated in FIG. 14 or FIG. 16 by using the memory management information 102 of the past and the memory management information 102 of this time. Next, a method of generating a memory map from the memory management information 102 is further described.

Figure 23:
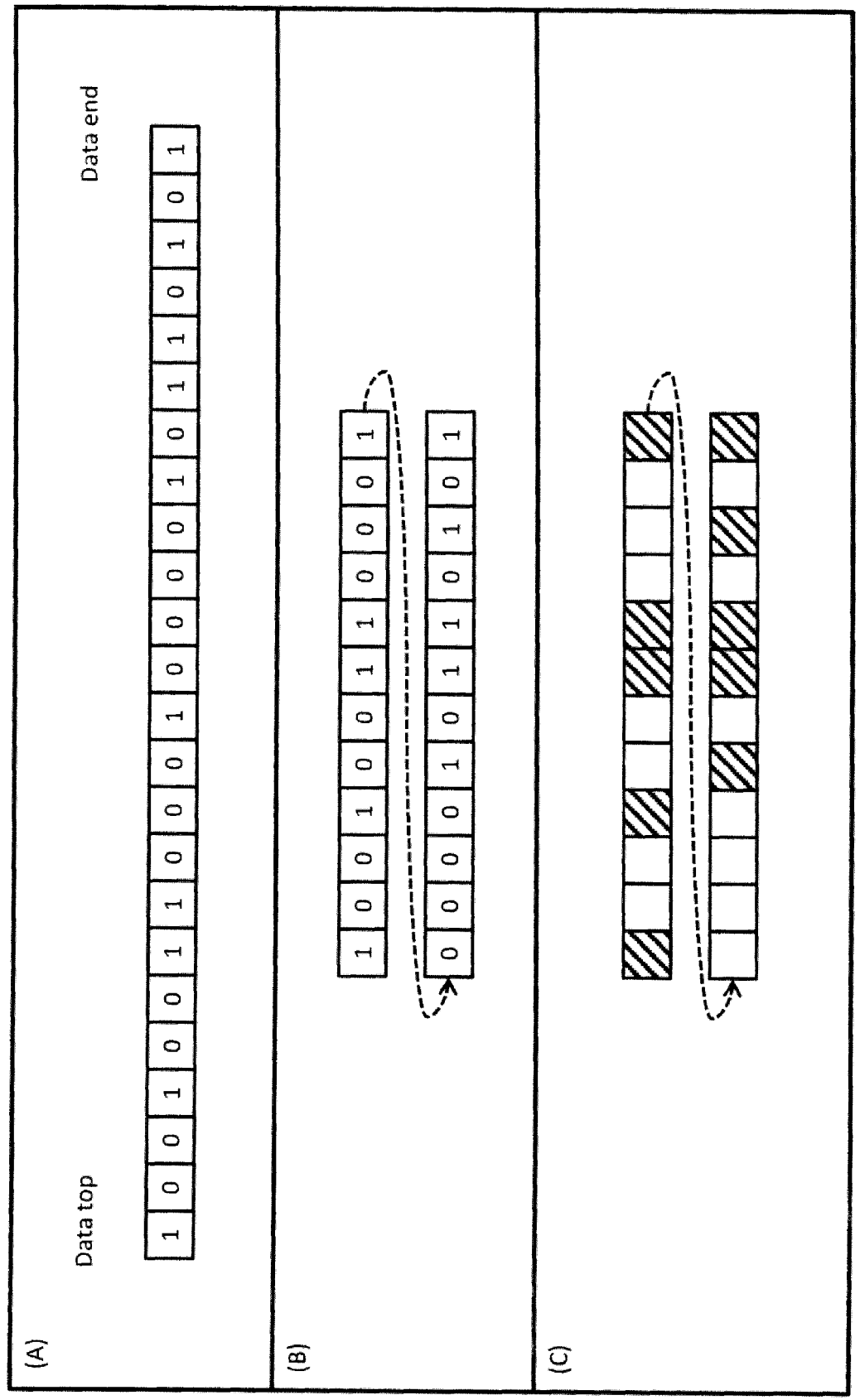
FIG. 23 is an explanatory diagram of a method of generating a memory map from memory management information.

FIG. 23 is a view illustrating an explanatory diagram of a method of generating a memory map from the memory management information 102. The screen generation unit 202 of the management computer 2 sequentially extracts values of the rewrite flags 124 from a top of the page address from the memory management information 102 contained in the progress information, and make a one dimensional data array (refer to FIG. 23 (A)). Then, the screen generation unit 202 folds the one dimensional data array for each predetermined number of units (for instance, for every 100 units), and convert them into data including a two dimensional coordinate (FIG. 23 (B)). Then, concerning the data including the two dimensional coordinate, the screen generation unit 202 generates images in which, for instance, data of a value "0" is converted to "colorless" and data of a value "1" is converted to "colored", and displays at the output unit 3b (FIG. 23 (C)). Thereby, a rewrite situation at a certain time point may be expressed graphically. Next, a description returns to FIG. 22.

The screen generation unit 202 of the management computer 2 calculates expected completion time of the live migration process on the basis of an average transfer rate for the data transfer (S607).

The screen generation unit 202 of the management computer 2 determines whether or not "expected completion time>timeout time" is satisfied (S607).

When "expected completion time≤timeout time" (S607: NO) is satisfied, the screen generation unit 202 of the management computer 2 directly proceeds to a process of a step S609. When "expected completion time>timeout time" (S607:YES) is satisfied, the screen generation unit 202 of the management computer 2 generates a warning scree (S608) and proceeds to the process of the step S609.

In the step S609, the screen generation unit 202 of the management computer 2 generates the progress screen 213 or the statistics screen 214 and outputs to the output unit 3b (S609). Here, when a warning screen is generated in a step S608, a screen containing the warning screen is generated.

The embodiment of the present invention described above is an illustration for describing the present invention, which is not intended to limit the scope of the present invention only to the embodiment. A person skilled in the art may implement the present invention in various other modes without departing from the gist of the present invention. For instance, a clean page may be, instead of being a page other than a dirty page, data transferred in the live migration process and may also be a page in which data that is not updated from the virtual computer after the transfer is stored. In this case, as pages other than dirty pages, in addition to clean pages, other types of pages, for instance, free pages in which data is not stored may be managed.

REFERENCE SIGNS LIST

1 Computer system
2 Management computer
3 Input/output apparatus
4 Computer
23 Hypervisor
211 Selection screen
212 Setting screen
213 Progress screen
214 Statistics screen
215 Memory map screen

The invention claimed is:

1. A virtual computer system comprising:
a plurality of computers on which at least one virtual computer is configured to operate on a hypervisor included in a computer of the plurality of computers; and
a management computer that is configured to manage the plurality of computers, wherein the management computer includes:
an input unit that is configured to accept an operation input of an operator; and
a screen generation unit that is configured to
acquire, in a state where a first virtual computer operates on a first computer, progress information concerning a live migration in which the first virtual computer is transferred from the first computer to a second computer, the progress information being acquired from the first computer;
generate statistical information concerning the live migration on a basis of the acquired progress information; and
generate a statistics screen containing the statistical information and an output unit that is configured to display the statistics screen;
the hypervisor is configured to allocate a virtual calculation unit and a virtual memory, which are formed by logically dividing a calculation unit and a memory included in the computer, to the virtual computer that is configured to operate on the computer, wherein the memory of the computer includes a plurality of memory pages corresponding to areas formed by dividing the memory;

the hypervisor includes memory management information for managing correspondence between memory pages of the memory and memory pages of the virtual memory and presence or absence of rewrites of the memory pages for each of the virtual computers;

a hypervisor of the first computer is configured to transfer information stored in a memory of the first computer allocated for the first virtual computer, to a memory of the second computer; and when the output unit of the management computer displays a memory map as the statistics screen, the screen generation unit is configured to acquire memory management information of the first virtual computer from the hypervisor of the first computer;

generate a memory map screen in which memory pages that are rewritten and memory pages that are not rewritten are displayed in different display formats, by referring to the acquired memory management information of the first virtual computer; and output the memory map screen to the output unit.

2. A virtual computer system according to claim 1, wherein the memory pages that are rewritten are dirty pages each of which is given a rewrite flag indicating that rewrite has occurred in the memory page in the memory management information, the memory pages that are not rewritten are clean pages each of which is given a rewrite flag indicating that rewrite has not occurred in the memory page in the memory management information, and the screen generation unit is configured to generate the memory map on a basis of the rewrite flag for each of the memory pages, by referring to the rewrite flags in the acquired memory management information.

3. A virtual computer system according to claim 2, wherein the memory management information includes transfer flags that represent whether or not the memory pages can be transferred in the live migration.

4. A virtual computer system according to claim 2, wherein the hypervisor of the first computer further includes status management information for managing information concerning execution situation of the live migration for each of the virtual computers;

the screen generation unit is configured to acquire the status management information from the hypervisor of the first computer at each time point and generate a graph screen having a graph representing a variation of a value of a predetermined type in the live migration process on a basis of the status management information acquired at each time point; and the output unit is configured to display the graph screen.

5. A virtual computer system according to claim 4, wherein the status management information includes a total sum of the dirty pages and the value of the predetermined type is the total sum of the dirty pages.

6. A virtual computer system according to claim 5, wherein the status management information includes a total amount of memory pages in which migration from the first computer to the second computer is completed the screen generation unit is configured to calculate a transfer rate of the memory pages on a basis of the total amount of the memory pages at each time point; and the value of the predetermined type is the transfer rate of the memory pages.

7. A virtual computer system according to claim 6, wherein the hypervisor of the first computer is configured to stop the live migration process after predetermined timeout time has elapsed;

the screen generation unit is configured to calculate remaining time until the live migration process is completed, from the total sum of the dirty pages and a temporal change of the transfer rate of the memory pages and generate a warning screen indicating that the live migration process is not completed when the remaining time is longer than remaining time until the predetermined timeout time; and the output unit is configured to display the warning screen.

8. A virtual computer system according to claim 7, wherein the screen generation unit is configured to generate a stop acceptance screen for accepting a stop request of the live migration process; and the output unit is configured to display the stop acceptance screen as well as the warning screen.

9. A virtual computer system according to claim 8, wherein the screen generation unit is configured to generate an extension acceptance screen for accepting a request for an extension of the timeout time; and the output unit is configured to display the extension acceptance screen as well as the warning screen.

10. A virtual computer system according to claim 1, wherein the hypervisor of the first computer includes setting information concerning the live migration process, and is configured to execute the migration process on a basis of the setting information; and the screen generation unit is configured to generate a parameter input screen for accepting an input of parameters relating to the setting information and reflect the parameters that have been input on the parameter input screen, in the setting information included in the hypervisor.

11. A virtual computer system according to claim 10, wherein the parameter input screen includes an input area of timeout time of the live migration process, and the timeout time input to the input area is reflected in the setting information; and the hypervisor of the first computer is configured to stop the live migration process when the timeout time reflected in the setting information has elapsed.

12. A management computer configured to manage a plurality of computers on which at least one virtual computer operates on a hypervisor included on a computer of the plurality of computers, comprising:

an input unit that is configured to accept an operation input of an operator;

a screen generation unit that is configured to acquire, in a state where a first virtual computer operates on a first computer, progress information concerning a live migration in which the first virtual computer is transferred from the first computer to a second computer, the progress information being acquired from the first computer;

generate statistical information concerning the live migration on the basis of the acquired progress information; and generate a statistics screen containing the statistical information; and an output unit that is configured to display the statistics screen, wherein the hypervisor is configured to allocate a virtual calculation unit and a virtual memory, which are formed by logically dividing a calculation unit and a memory included in the computer, to the virtual computer that is configured to operate on the computer, wherein the memory of the computer includes a plurality of memory pages corresponding to areas formed by dividing the memory;

the hypervisor includes memory management information for managing correspondence between memory pages of the memory and memory pages of the virtual memory and presence or absence of rewrites of the memory pages for each of the virtual computers;

a hypervisor of the first computer is configured to transfer information stored in a memory of the first computer allocated for the first virtual computer, to a memory of the second computer; and when the output unit of the management computer displays a memory map as the statistics screen, the screen generation unit is configured to
- acquire memory management information of the first virtual computer from the hypervisor of the first computer;
- generate a memory map screen in which memory pages that are rewritten and memory pages that are not rewritten are displayed in different display formats, by referring to the acquired memory management information of the first virtual computer; and
- output the memory map screen to the output unit.

13. A computer management method for managing a plurality of computers on which at least one virtual computer operates on a hypervisor included on a computer of the plurality of computers, comprising:

accepting an operation input of an operator;

acquiring, in a state where a first virtual computer operates on a first computer, progress information concerning a live migration in which the first virtual computer is transferred from the first computer to a second computer, the progress information being acquired from the first computer;

generating statistical information concerning the live migration on the basis of the acquired progress information, generating a statistics screen containing the statistical information; and displaying the statistics screen allocating, by the hypervisor, a virtual calculation unit and a virtual memory, which are formed by logically dividing a calculation unit and a memory included in the computer, to the virtual computer that is configured to operate on the computer, wherein the memory of the computer includes a plurality of memory pages corresponding to areas formed by dividing the memory;

managing, by the hypervisor via memory management information, correspondence between memory pages of the memory and memory pages of the virtual memory and presence or absence of rewrites of the memory pages for each of the virtual computers;

transferring, by a hypervisor of the first computer, information stored in a memory of the first computer allocated for the first virtual computer to a memory of the second computer; and when the output unit of the management computer displays a memory map as the statistics screen,
- acquiring, by the screen generation unit, memory management information of the first virtual computer from the hypervisor of the first computer;
- generating, by the screen generation unit, a memory map screen in which memory pages that are rewritten and memory pages that are not rewritten are displayed in different display formats, by referring to the acquired memory management information of the first virtual computer; and
- outputting, by the screen generation unit, the memory map screen to the output unit.

* * * * *